(12) United States Patent
Ritchie et al.

(10) Patent No.: US 11,645,449 B1
(45) Date of Patent: May 9, 2023

(54) COMPUTING SYSTEM FOR DATA ANNOTATION

(71) Applicant: Wells Fargo Bank, N.A., San Francisco, CA (US)

(72) Inventors: Misty K. Ritchie, Cramerton, NC (US); John M. Douangdara, Charlotte, NC (US); Shad K. Martin, Frisco, TX (US); Karl R. Johnson, Castle Rock, CO (US); Kristin L. Knittie, Des Moines, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/112,685

(22) Filed: Dec. 4, 2020

(51) Int. Cl.
  *G06F 17/00* (2019.01)
  *G06F 40/169* (2020.01)
  (Continued)

(52) U.S. Cl.
  CPC .......... *G06F 40/169* (2020.01); *G06N 20/00* (2019.01); *G06Q 30/0281* (2013.01); *G06Q 30/0282* (2013.01)

(58) Field of Classification Search
  CPC .............. G06F 40/169; G06Q 30/0281; G06Q 30/0282; G06N 20/00
  (Continued)

(56) References Cited

U.S. PATENT DOCUMENTS 5,566,291 A * 10/1996 Boulton ................. G09B 5/065
  434/118
7,577,246 B2   8/2009 Idan et al.
  (Continued)

FOREIGN PATENT DOCUMENTS

CN    108959431 A   12/2018
KR    102107911 B1   5/2020
WO    2004017550 A2   2/2004

OTHER PUBLICATIONS

Oladapo, Using Machine Learning and Thematic Analysis Methods to Evaluate Mental Health Apps Based on Use Reviews', Published Jun. 2020, IEEE Access (Year: 2020).*

(Continued)

*Primary Examiner* — Stephen S Hong
*Assistant Examiner* — Matthew J Ludwig
(74) *Attorney, Agent, or Firm* — Shumaker & Sieffert, P.A.

(57) ABSTRACT

An example computing system receives annotation data associated with a plurality of customer communication messages is described. The computing system generates, for display on each of a plurality of reviewer computing devices, an annotation interface through which each reviewer may input annotation data associated with an assigned subset of the plurality of messages. The annotation data may include data indicative of whether the message includes a complaint. An annotation process may include receiving annotation data associated with the message from a first reviewer and a second reviewer, and determining whether the annotation data received from the first reviewer and the annotation data received from the second reviewer are in agreement. If not, the annotation process may further include receiving annotation data associated with the message from a third reviewer, wherein the third reviewer has a higher reviewer permission level than both the first and the second reviewer.

18 Claims, 12 Drawing Sheets

(51) Int. Cl.
  *G06Q 30/02* (2023.01)
  *G06Q 30/0282* (2023.01)
  *G06N 20/00* (2019.01)

(58) Field of Classification Search
  USPC .......................................................... 715/230
  See application file for complete search history.

(56) References Cited

U.S. PATENT DOCUMENTS

| | | | |
|---|---|---|---|
| 8,082,277 B1* | 12/2011 | O'Brien | G06Q 10/101 707/758 |
| 9,118,763 B1 | 8/2015 | Margulies et al. | |
| 9,413,891 B2* | 8/2016 | Dwyer | H04M 3/5191 |
| 10,224,037 B2 | 3/2019 | Klein et al. | |
| 10,277,628 B1* | 4/2019 | Jakobsson | H04L 51/00 |
| 10,360,257 B2* | 7/2019 | Hou | G06F 40/169 |
| 10,510,449 B1* | 12/2019 | Reicher | G16H 15/00 |
| 10,529,030 B2* | 1/2020 | Kataria | G06Q 50/01 |
| 10,769,766 B1* | 9/2020 | Padfield | G06K 9/6259 |
| 11,120,200 B1* | 9/2021 | Totale | G06F 3/04842 |
| 11,218,386 B2* | 1/2022 | Kumar | H04L 41/044 |
| 2007/0124278 A1* | 5/2007 | Lewis | G16B 50/30 |
| 2012/0304304 A1* | 11/2012 | Avrahami | H04L 9/085 726/27 |
| 2014/0358518 A1* | 12/2014 | Wu | G06F 40/58 704/3 |
| 2016/0203566 A1* | 7/2016 | Kataria | G06Q 10/06398 709/206 |
| 2017/0004543 A1* | 1/2017 | Bhamidipati | G06Q 30/0242 |
| 2017/0359284 A1* | 12/2017 | Sudduth | H04L 51/212 |
| 2018/0068222 A1* | 3/2018 | Brennan | G06N 5/022 |
| 2018/0075368 A1* | 3/2018 | Brennan | G06F 16/35 |
| 2018/0190291 A1 | 7/2018 | Lore et al. | |
| 2018/0225591 A1 | 8/2018 | Chandramouli et al. | |
| 2018/0300576 A1 | 10/2018 | Dalyac et al. | |
| 2019/0205667 A1 | 7/2019 | Avidan et al. | |
| 2019/0303726 A1 | 10/2019 | Cote et al. | |
| 2020/0019883 A1 | 1/2020 | McCourt, Jr. | |
| 2020/0067861 A1* | 2/2020 | Leddy | H04L 51/12 |
| 2020/0294528 A1 | 9/2020 | Perri et al. | |
| 2020/0387570 A1 | 12/2020 | Biswas et al. | |
| 2021/0158366 A1* | 5/2021 | Arnold | H04M 3/5235 |
| 2021/0216822 A1* | 7/2021 | Paik | G16H 15/00 |
| 2021/0326719 A1* | 10/2021 | Mahmud | G06N 20/00 |

OTHER PUBLICATIONS

Bontcheva, 'GATE Teamware: a web-based, collaborative text annoation framework', Land Resources & Evaluation (Year: 2013).*

Chen, Min, et al., "Label-less Learning for Emotion Cognition," IEEE Transactions on Neural Networks and Learning Systems, Jun. 29, 2020, 11 pp.

Clarabridge, "Intelligently Listen to and Analyse Multi-Channel Customer Feedback Data in Real-Time," Data Sheet, accessed from http://www.clarabridge.com/wp-content/uploads/2014/02/analyze61_ds_EMEA_2014.pdf, uploaded Feb. 2014, retrieved on Dec. 2019, 2 pages.

Hendrycks, Dan, et al., "Using Trusted Data to Train Deep Networks on Labels Corrupted by Severe Noise," Advances in neural information processing systems, Dec. 3-8, 2018, 10 pp.

Stanley, Robert, "NLP, AI & Speech Analytics in the Contact Center," retrieved from (https://callminer.com/blog/nlp-ai-speech-analytics-in-thecontact-center/, Mar. 7, 2017, 10 pp.

U.S. Appl. No. 16/781,620, filed Feb. 4, 2020, by Mann et al.

U.S. Appl. No. 17/099,666, filed Nov. 16, 2020, by Mann et al.

Tong et al., "A Complaint Text Classification Model Based on Character-Level Convolutional Network", 2018 IEEE 9th International Conference on Software Engineering and Service Science (ICSESS), IEEE, Nov. 2018, pp. 507-511.

* cited by examiner

FIG. 3

COMPUTING SYSTEM FOR DATA ANNOTATION

TECHNICAL FIELD

The disclosure relates to computing systems, and more specifically, computing systems used to perform data annotation for development and performance assessment of machine learning models.

BACKGROUND

A customer service center is a facility configured to handle incoming messages from customers or potential customers of a business or organization. One function of the customer service center is to handle customer service requests, such as customer inquiries or complaints, focused on one or more products or services provided by the business, e.g., customer accounts and loans. Although many customer service requests can be handled through online interactions (e.g., via websites, email, or mobile applications), for some businesses, a customer service center may be regarded as necessary. A customer service center may include one or more message analysis systems and one or more agent desktop systems used by a number of human agents that are representatives of the business.

SUMMARY

In general, this disclosure describes a computing system and method for multi-level review and annotation of data for development and/or performance assessment of machine learning models for customer communications associated with an organization. According to some aspects of the present disclosure, the computing system selects data, such as customer communication messages, for review, and assigns each message to two or more human subject matter experts. The computing system generates, for display on a reviewer computing device, a guided user-friendly annotation interface for reviewers to input annotation data. The computing system receives annotation data associated with a message from each reviewer assigned to the message via the annotation interface. In some examples, the annotation data may include annotation data indicative of whether the message includes a complaint, annotation data indicative of whether the message includes a high risk complaint, annotation data indicative of whether the message includes a negative behavior description, and/or annotation data indicative of a reason or category associated with the message. In some examples, the computing system is designed to be able to add fields for additional annotation categories as the need arises.

According to some aspects of the present disclosure, the computing system provides the data that trains a machine learning model, based on the annotation data received for each of the plurality of messages, to classify whether a message includes a complaint, or to predict a likelihood that a message includes a complaint. According to some aspects of the present disclosure, a computing system trains a machine learning model, based on the annotation data received for each of the plurality of messages, to classify whether a message includes a complaint, or to predict a likelihood that a message includes a complaint.

According to some other aspects of the present disclosure, the computing system performs one or more measurements on the annotation data, the reviewers, and/or the machine learning model. The one or more measurements may include evaluations of the annotation data assigned by the reviewers, such as reproducibility, repeatability, comparison to a standard (e.g., the reviewer's label), stability over time, and comparison to a model's classification.

The techniques of this disclosure may provide one or more advantages. The computing system streamlines the annotation process to improve reviewer performance and quality, and creates rich data elements to enhance model development for machine learning and artificial intelligence approaches. For example, the system presents a guided and user-friendly interface for reviewers to input annotation data, thus increasing the likelihood that the correct annotation data will be assigned to each message. In addition, by assigning messages to two or more reviewers and determining whether the annotation data received from the two or more reviewers agree, more reproducible, repeatable and consistent annotation data may be achieved. With more accurate and consistently labeled training data, the resulting machine learning models may be better able to predict and/or classify novel message data. The system may be able to handle multiple types of unstructured data for annotation, including emails, phone transcriptions, survey comments or links to voice files. Each message type may thus be subject to the same structure and flow for data annotation to create consistent treatment of the customer message.

In one example, the disclosure is directed to a computing system comprising a memory; and one or more processors in communication with the memory and configured to receive a plurality of messages received from one or more user devices; associate one or more of the plurality of messages with at least a first reviewer and a second reviewer; generate an annotation interface for display on a first computing device associated with the first reviewer and on a second computing device associated with the second reviewer, wherein the annotation interface displayed on the first computing device and the annotation interface displayed on the second computing device each includes a text data field including text data representative of a first message of the plurality of messages; receive first annotation data for the first message input into the annotation interface displayed on the first computing device associated with the first reviewer, the first annotation data indicative of whether the first message includes a complaint; receive second annotation data for the first message input into the annotation interface displayed on the second computing device associated with the second reviewer, the second annotation data indicative of whether the first message includes a complaint; and select one of the first or second annotation data as ground truth annotation data for the first message based on a first reviewer permission level assigned to the first reviewer and a second reviewer permission level assigned to the second reviewer.

In another example, the disclosure is directed to a method comprising receiving, by one or more processors, a plurality of messages received from one or more user devices; associating, by the one or more processors, one or more of the plurality of messages with at least a first reviewer and a second reviewer; generating, by the one or more processors, an annotation interface for display on a first computing device associated with the first reviewer and on a second computing device associated with the second reviewer, wherein the annotation interface displayed on the first computing device and the annotation interface displayed on the second computing device each includes a text data field including text data representative of a first message of the plurality of messages; receiving, by the one or more processors first annotation data for the first message input into the annotation interface displayed on the first computing device associated with the first reviewer, the first annotation data indicative of whether the first message includes a complaint; receiving, by the one or more processors, second annotation data for the first message input into the annotation interface displayed on the second computing device associated with the second reviewer, the second annotation data indicative of whether the first message includes a complaint; and selecting, by the one or more processors, one of the first or second annotation data as ground truth annotation data for the first message based on a first reviewer permission level assigned to the first reviewer and a second reviewer permission level assigned to the second reviewer.

In another example, the disclosure is directed to a computer readable medium comprising instructions that when executed cause one or more processors to receive a plurality of messages received from one or more user devices; associate one or more of the plurality of messages with at least a first reviewer and a second reviewer; generate an annotation interface for display on a first computing device associated with the first reviewer and on a second computing device associated with the second reviewer, wherein the annotation interface displayed on the first computing device and the annotation interface displayed on the second computing device each includes a text data field including text data representative of a first message of the plurality of messages; receive first annotation data for the first message input into the annotation interface displayed on the first computing device associated with the first reviewer, the first annotation data indicative of whether the first message includes a complaint; receive second annotation data for the first message input into the annotation interface displayed on the second computing device associated with the second reviewer, the second annotation data indicative of whether the first message includes a complaint; and select one of the first or second annotation data as ground truth annotation data for the first message based on a first reviewer permission level assigned to the first reviewer and a second reviewer permission level assigned to the second reviewer.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 is a conceptual diagram illustrating an example annotation interface by which the annotation management system may receive annotation data input by a reviewer, in accordance with one or more techniques of this disclosure.

DETAILED DESCRIPTION

Figure 1:
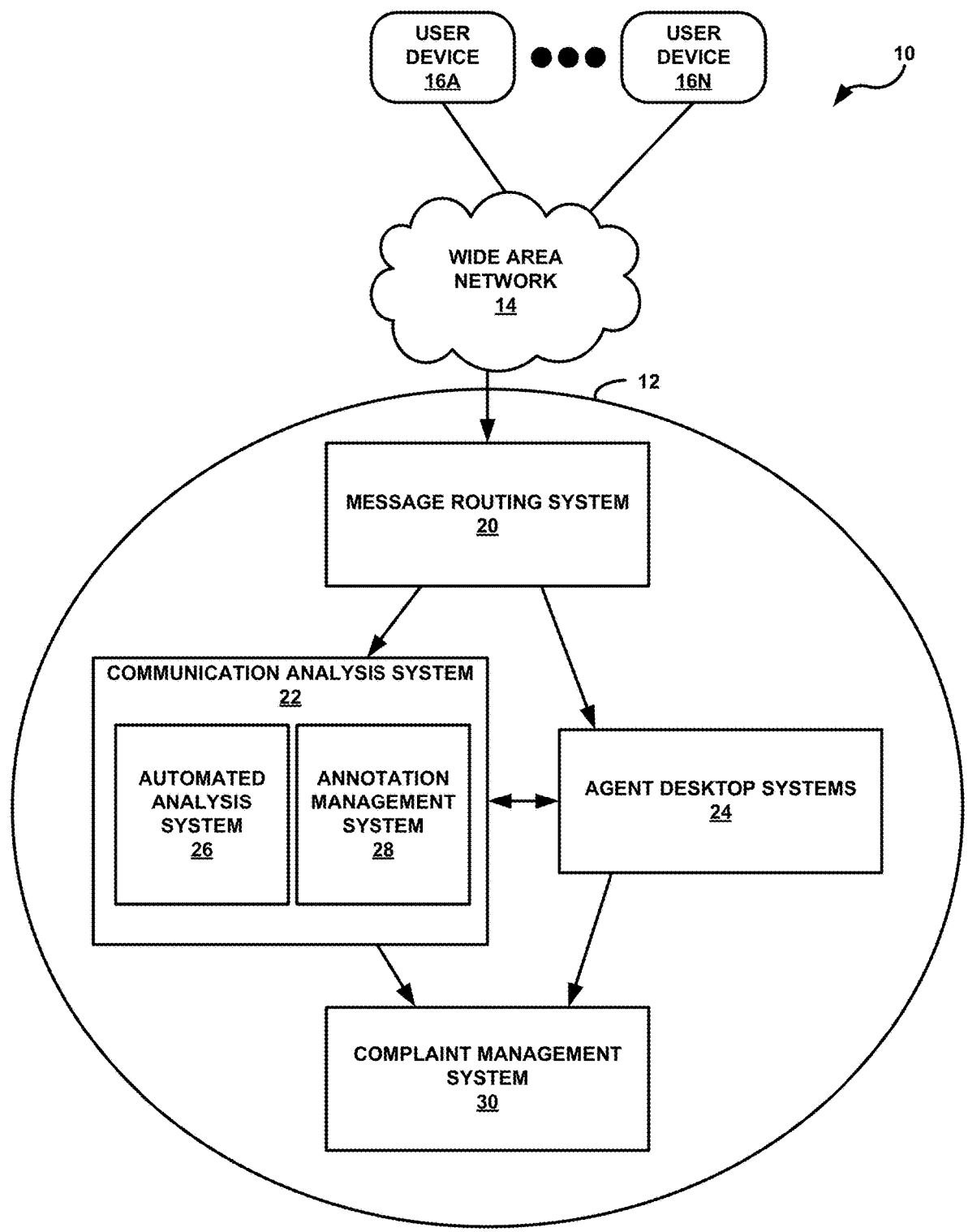
FIG. 1 is a block diagram illustrating an example message center within a network that includes a communication analysis system configured to receive annotation data for one or more messages, in accordance with one or more techniques of this disclosure.

FIG. 1 is a block diagram illustrating an example message center 12 within a network 10 that includes an annotation management system 28 configured to receive annotation data for one or more messages, in accordance with one or more techniques of this disclosure. Network 10 includes one or more user devices 16A-16N (collectively "user devices 16") in communication with message center 12 via a network 14.

Message center 12 is a facility configured to handle incoming messages from user devices 16 operated by users that may be customers or potential customers of a business or organization. Message center 12 includes several disparate computing systems configured to handle customer service inquiries and communications ("messages") focused on customer accounts with the business or other services provided by the business. For example, when the organization is a financial institution, message center 12 may handle many different tasks for customers and/or potential customers such as servicing existing accounts, opening new accounts, servicing existing loans, opening new loans, answering questions, etc. In the example of FIG. 1, message center 12 includes a message routing system 20, a communication analysis system 22 including an automated communication analysis system 26 and an annotation management system 28, agent desktop systems 24, and complaint management system 30. Message center 12 may include a centralized or distributed network of the disparate computing systems made up of interconnected desktop computers, laptops, workstations, wireless devices, network-ready appliances, file servers, print servers, or other computing devices. For example, message center 12 may include one or more data centers including a plurality of servers configured to provide account services interconnected with a plurality of databases and other storage facilities in which customer credentials, customer profiles, and customer accounts are stored. The architecture of message center 12 illustrated in FIG. 1 is shown for exemplary purposes only and should not be limited to this architecture. In other examples, message center 12 may include more, fewer, or different computing systems configured to handle messages representing customer service inquiries.

In some examples described in this disclosure, message center 12 may be a customer service center of a bank or other financial institution. Message center 12 may allow customers to speak to a live person ("agent") when resolving service issues and/or leave a voice message detailing one or more service issues. Additionally, or alternatively, message center 12 may allow customers to submit messages via text channels such as email, text messaging, and social media messaging.

User devices 16 may be any suitable communication or computing device, such as a conventional or landline phone, or a mobile, non-mobile, wearable, and/or non-wearable computing device capable of communicating over network 14 through which customers may communicate messages for receipt by the message center 12. For example, each user device of user devices 16 may include any one or combination of a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, and non-mobile computing device that may perform operations in accordance with one or more aspects of the present disclosure. One or more of user devices 16 may support communication services over packet-switched networks, e.g., the public Internet, including Voice over Internet Protocol (VOIP). One or more of user devices 16 may also support communication services over circuit-switched networks, e.g., the public switched telephone network (PSTN).

Each of user devices 16 is operated by a user that may be a current customer, past customer, valid representative of a customer, or a potential customer of the business or organization that provides message center 12. In the case of a business or corporate customer, the user may be a representative of the business or a corporate customer. In some examples, the user may be a customer who wishes to convey a complaint and/or a concern about one or more services provided by the business or organization that provides message center 12 or another aspect relating to the business or organization. In one or more cases where the user conveys a complaint or a concern, the complaint or concern may include a level of severity, or urgency. For example, message center 12 may receive a message from a user device of user device 16, where the message is representative of a user complaint. In some examples, the message may be associated with a first risk level or a second risk level. The first risk level may be relatively greater than the second risk level. For example, messages of the first risk level may include a greater level of severity or urgency than messages of the second risk level.

Network 14 may be a computer network (e.g., a wide area network (WAN), such as the Internet, a local area network (LAN), or a virtual private network (VPN)), a telephone network (e.g., the PSTN or a wireless network), or another wired or wireless communication network. Although illustrated as a single entity, network 14 may include a combination of multiple networks.

In the example of FIG. 1, message center 12 includes one or more agent desktop systems 24 used by a number of human agents that are representatives of the business or organization. These systems may be third-party vendor products used by the business or organization to interact with its customers. Message center 12 also includes message routing system 20 and communication analysis system 22. In this example, message routing system 20 and communication analysis system 22 may be propriety tools of the business or organization to facilitate the functions of message center 12, including collecting, storing, analyzing and maintaining data used by message center 12.

Message routing system 20 of message center 12 receives inbound messages from network 14 and determines whether to route the inbound messages to one or both of communication analysis system 22 and agent desktop systems 24. Additionally, or alternatively, message routing system 20 may route messages to one or more devices, users, or systems other than communication analysis system 22 and agent desktop systems 24. In an example where the incoming message represents a voice message including voice data, a voice-to-text engine (not illustrated in FIG. 1) may be configured to convert the voice data to text data, where the text data is indicative of one or more words, phrases, exclamations, and other sounds conveyed in the voice message, and then route to communication analysis system 22 and/or agent desktop system 24.

For messages that are routed to communication analysis system 22, the messages may be transmitted to one or both of automated communication analysis system 26 and annotation management system 28. Automated communication analysis system 26 automatically identifies and/or classifies each incoming message according to whether the message is representative of a user complaint. For example, communication analysis system 26 may include one or more trained machine learning models that receive the incoming messages as input and that automatically perform complaint identification and classification for each message. In some examples, automated communication analysis system 26 may be implemented as described in U.S. patent application Ser. No. 16/781,620, filed Feb. 4, 2020, and entitled, "Complaint Classification in Customer Communications Using Machine Learning Models," and U.S. patent application Ser. No. 17/099,666, filed Nov. 16, 2020, and entitled, "Team Member Behavior Identification in Customer Communications Using Computer-based Models," both of which are incorporated by reference herein in its entirety.

In accordance with one or more techniques of this disclosure, annotation management system 28 provides a structured system by which annotation data associated with incoming messages is received, managed and/or analyzed. Annotation management system 28 provides for multi-level review and labeling of data for development and training of the machine learning models in automated communication analysis system 26. For example, annotation management system 28 may guide one or more human reviewers through an annotation process by which annotation data associated with incoming messages is received. The annotation data may include, for example, for each message, annotation data indicative of whether the message includes a complaint. As another example, the annotation data for each message may include annotation data indicative of whether the message includes a high risk complaint. As another example, the annotation data for each message may include one or more complaint types of a set of complaint types and/or one or more complaint reasons of a set of complaint reasons.

In some examples, the annotation data may include annotation data indicative of whether the message includes a complaint, and annotation data indicative of the type of complaint. As another example, the annotation data may include annotation data indicative of whether the message includes a high risk complaint, and annotation data indicative of the type of high risk complaint. As another example, the annotation data may include annotation data indicative of whether the message includes a negative behavior description, and annotation data indicative of the type of negative behavior description.

It shall be understood that, while the present disclosure describes annotation data concerning complaint, high risk complaint, negative behavior description and reason/category as elements that are annotated, each component may include further additional granular detail. For example, for a complaint, there may be one or more types of complaints that further inform the annotation—expression of dissatisfaction, assertion of wrongdoing and concerning a WF product or service. In addition, it shall be understood that these elements may include more or different types of annotation data in order to meet the needs of a particular institution or business entity, changing policies, procedures, or line of business practices.

In addition or alternatively, the annotation data received and/or managed by annotation management system 28 may be used to train one or more machine learning models (such as the one or more machine learning models of automated communication analysis system 26, for example) to automatically identify whether a message includes a complaint. As another example, the annotation data may be used to train one or more machine learning models to automatically identify whether a message includes a high risk complaint. As another example, the annotation data may be used to train one or more machine learning models to automatically identify the message as including one or more complaint types of a set of complaint types and/or one or more complaint reasons of a set of complaint reasons.

In one or more examples in accordance with the techniques of the present disclosure, annotation management system 28 may guide one or more human reviewers through an annotation process by which annotation data associated with incoming messages is received. For example, annotation management system 28 may present one or more annotation interfaces at agent desktop systems 24 that guide one or more human reviewers through an annotation process by which the one or more human reviewer input annotation data associated with incoming messages. In this way, annotation management system 28 may receive annotation data corresponding to each message from one or more human reviewers. Annotation management system 28 saves the annotation data received from each reviewer for each message in, for example, an annotation database. For example, annotation management system 28 may include or have associated with it one or more storage devices, such as one or more databases, in which the messages and the annotation data corresponding to each message may be stored.

Annotation management system 28 may automatically route each message in accordance with an annotation process to one or more human reviewers for entry of annotation data. For example, the annotation process may include routing of a message to a first reviewer, routing the message to a second reviewer, determining whether first annotation data associated with the message received from the first reviewer agrees with second annotation data associated with the message received from the second reviewer, in response to a determination that the first annotation data associated with the message received from the first reviewer does not agree with the second annotation data associated with the message received from the second reviewer, routing the message to a supervisory reviewer, and receiving supervisory annotation data associated with the message input by the supervisory reviewer.

The annotation management system may also route messages according to one or more pre-set flags based on model output and/or previous annotation/ground truth results. The system can compare the human annotation/reviewer results with these pre-set flags to determine if additional routing (e.g., supervisory level review) is required.

Determining whether the first annotation data associated with the message received from the first reviewer agrees with the second annotation data associated with the message received from the second reviewer may include determining whether both the first annotation data and the second annotation data include data indicative of whether the message includes a complaint, and/or may including determining whether both the first annotation data and the second annotation data include data indicative that the message includes a high risk complaint.

In other examples, the annotation process executed by the annotation management system 28 may include routing the message for entry of annotation data to at least two human reviewers, routing the message for entry of annotation data to at least three human reviewers, and/or routing the message for entry of annotation data to four or more human reviewers. The annotation process executed by the annotation management system 28 may further include assigning human reviewers to one or more reviewer permission levels and routing the messages to two or more human reviewers in a sequence based on their assigned reviewer permission levels.

In some examples, the annotation management system creates and stores a final "Ground Truth" record for each message. This Ground Truth is the final decision on any of the annotation questions (such as complaint, high risk complaint, negative behavior description, reason/category, etc.) once all individual human reviews are completed. The Ground Truth is defined based on the workflow attributes for each message record that determine the number of First Level Reviews required, plus routing of records for Supervisory level review of disagreements, Arbitration, or other reviews completed. This allows consistent Ground Truth across all messages with varying review requirements. In this way, regardless of the number of reviews required based on workflow/disagreement, the annotation management system creates a standard data set that may be used for model training and reporting purposes.

Communication analysis system 22, including automated communication analysis system 26 and/or annotation management system 28 and/or complaint management system 30, may be implemented as any suitable computing system(s), such as one or more server computers, workstations, mainframes, appliances, cloud computing systems, and/or other computing systems that may be capable of performing operations and/or functions described in accordance with one or more aspects of the present disclosure. In some examples, communication analysis system 22 and/or complaint management system 30 may be implemented as one or more cloud computing systems, server farms, and/or server clusters (or portions thereof) that provide services to client devices and other devices or systems. In other examples, communication analysis system 22 and/or complaint management system 30 may represent or be implemented through one or more virtualized compute instances (e.g., virtual machines, containers) of a data center, cloud computing system, server farm, and/or server cluster. Communication analysis system 22 and/or complaint management system 30 may communicate with external systems via one or more networks (e.g., message center 12). In some examples, communication analysis system 22 and/or complaint management system 30 may use network interfaces (such as Ethernet interfaces, optical transceivers, radio frequency (RF) transceivers, Wi-Fi or Bluetooth radios, or the like), telephony interfaces, or any other type of device that can send and receive information to wirelessly communicate with external systems, e.g., message routing system 20 and/or agent desktop systems 24.

In some examples, annotation management system 28 may receive message data delivered to a message center 12 from one of user devices 16 (e.g., user device 16A). In some examples, the message data may include text data. The text data may include, for example, a string of characters generated by user device 16A as a part of a text-based message such as a text message, an email, or a social media message. In some examples, the message data may include text data representative of a voice message, wherein the text data representative of the voice message is generated by a voice-to-text engine configured to convert an audio message into text data. In any case, the text data representative of the message may include one or more characters, words, phrases, or any combination thereof.

In some examples, annotation management system 28 may manage and cause an annotation process to be presented to one or more human reviewers by which annotation data corresponding to each message may be received from the one or more human reviewers. For example, annotation management system 28 may generate an annotation interface for display on agent desktop systems 24 corresponding to one or more human reviewers through which annotation data corresponding to each message may be received.

When a novel message is classified as including a complaint by automated message analysis system 26, message center 12 may communicate the complaint message to complaint management system 30. Communication management system 30 may "elevate" high risk complaint messages within message center 12. Elevating a high risk complaint message may include flagging the high risk message as including a relatively more urgent or serious complaint or criticism of one or more services or aspects of the business or organization that provides message center 12 as compared to a non-high risk complaint message. Such flagging of a high risk complaint message may cause complaint management system 30 to prioritize an addressing of the high risk complaint message as compared to non-high risk complaint messages. In some examples, elevating a high risk message includes outputting, using complaint management system 29, an alert indicating that the message is flagged as high risk. In some examples, complaint management system 29 may send one or more messages or other communications to the user device of user devices 16 which submitted the message representing the customer complaint in an attempt to resolve the customer complaint.

Figure 2A:
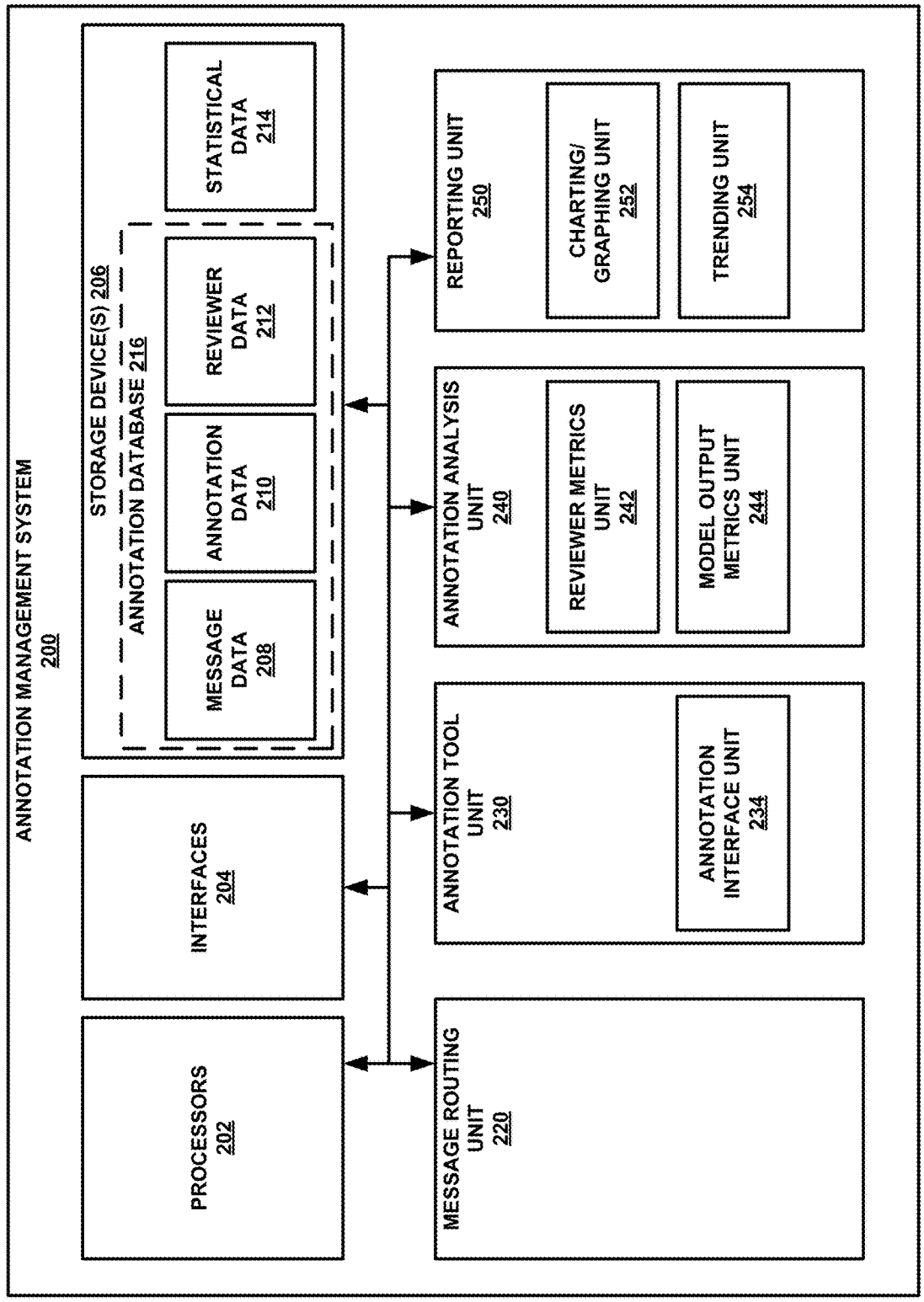
FIG. 2A is a block diagram illustrating an example annotation management system, in accordance with one or more techniques of this disclosure.

FIG. 2A is a block diagram illustrating an example annotation management system 200, in accordance with one or more techniques of this disclosure. Annotation management system 200 of FIG. 2A may be described as an example or alternative implementation of annotation management system 28 within message center 12 of FIG. 1. One or more aspects of annotation management system 200 of FIG. 2A may be described within the context of message center 12 of FIG. 1. The architecture of annotation management system 200 illustrated in FIG. 2 is shown for purposes of example only, and it shall be understood that the disclosure is not limited in this respect.

Annotation management system 200 provides a structured system by which annotation data associated with incoming messages is received, managed and/or analyzed. To that end, annotation management system 200 provides for multi-level review of a plurality of messages and receipt of annotation data associated with each message in a plurality of messages. The annotation data may be used for development of machine learning models for the prediction and/or classification of messages. In that respect, the messages annotated using the annotation management system 200 may be considered training messages, and both the training messages and the annotation data associated with each training message may be considered training data. The annotation data may include any one or combination of data indicative of whether a message includes a complaint and/or annotation data indicative of whether the message includes a high risk complaint. The annotation data may also include other types of annotation data as described herein or that may be relevant to accurate and/or complete annotation of messages.

Annotation management system 200 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, annotation management system 200 represents a cloud computing system, server farm, and/or server cluster (or portion thereof) that provides services to client devices and other devices or systems. In other examples, annotation management system 200 may represent or be implemented through one or more virtualized compute instances (e.g., virtual machines, containers) of a data center, cloud computing system, server farm, and/or server cluster.

As shown in the example of FIG. 2A, annotation management system 200 includes one or more processors 202, one or more interfaces 204, and one or more storage units 206. Annotation management unit system 200 further includes a message routing unit 220, an annotation tool unit 230, and annotation analysis unit 240, and a reporting unit 250. Storage units 206 of annotation management system 200 may also store an operating system (not illustrated in FIG. 2) executable by processors 202 to control the operation of components of annotation management system 200. The components, units or modules of annotation management system 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within annotation management system 200. For example, processors 202 may be capable of processing instructions stored by storage units 206, message routing unit 220, annotation tool unit 230, annotation analysis unit 240, and/or reporting unit 250. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing processing devices or circuitry.

Annotation management system 200 may utilize interfaces 204 to communicate with, for example, any one or more of message routing system 20, automated analysis system 26 and/or complaint management system 30. Annotation management system 200 may also utilize interfaces 204 to communicate with external systems or computing devices via one or more networks, e.g., network(s) 14 of FIG. 1. The communication may be wired, wireless, or any combination thereof. Interfaces 204 may be network interfaces (such as Ethernet interfaces, optical transceivers, radio frequency (RF) transceivers, Wi-Fi or Bluetooth radios, or the like), telephony interfaces, or any other type of devices that can send and receive information.

Storage units 206 may be configured to store information within annotation management system 200. Storage units 206 may include one or more computer-readable storage media or computer-readable storage device(s). In some examples, storage units 206 include one or more of a short-term memory or a long-term memory. Storage units 206 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 206 are used to store program instructions for execution by processors 202. Storage units 206 may be used by software or applications running on annotation management system 200 to temporarily store information during program execution.

Storage units 206 also store data associated with annotation process(es) executed by annotation management system 200. For example, storage units 206 may store including an annotation database 216 that stores one or more of message data 208, annotation data 210, reviewer data 212 and/or statistical data 214. In some examples, annotation database 216 may include a relational database including tables for storage of data associated with annotation processes executed by management system 200. For example, message data 208, annotation data 210 and reviewer data 212 may be organized as a set of tables with columns and rows that are used to store data used or generated by annotation management system 26.

Message data 208 may include raw message data corresponding to each incoming message to be annotated, as well as any text data corresponding to the message received from a voice-to-text or other speech recognition application or service, or otherwise converted from the raw message data to a suitable text format. In this way, the system may be able to handle multiple types of unstructured data for annotation, including emails, phone transcriptions, survey comments or links to voice files. Each message type may thus be subject to the same structure and flow for data annotation to create consistent treatment of the customer message.

Message data 208 may also include, for example, one or more of a message ID, a date received, a reviewer ID, an assigned date, and due date, and any other relevant message data.

Reviewer data 212 may include data associated with each of two or more human reviewers authorized to interact with annotation management system 200. For example, reviewer data 212 may include data associated with each of a plurality of human reviewers, including a name, a user identification number (user id), a permission level, etc. The permission levels may include, for example, one or more of a superuser level, a supervisor level, an arbitrator level, a reviewer level and an oversight level. Example reviewer levels and example permissions that may be associated with each level are shown in Table 1:

TABLE 1

| Reviewer Levels | Permissions |
| --- | --- |
| Superuser | Can view or edit any field in the annotation data; only a Superuser can add or delete another Superuser. Superusers are able to set up all reviewers levels, defining applicable attributes of the reviewer for work routing/assignment. |
| Oversight | Can view any field and edit only oversight annotation data fields. In some examples, oversight annotation data fields may augment the annotated data, but do not override the ground truth. |

TABLE 1-continued

| Reviewer Levels | Permissions |
| --- | --- |
| Arbitrator | Can view any field and edit only arbitrator annotation data fields. In some examples, arbitration annotation data fields may augment the annotated data, but do not override the ground truth. |
| Supervisor | Can view any field and edit any annotation data fields. |
| Reviewer | Can view any field and edit only reviewer annotation data fields. |

Annotation data 210 may include annotation data corresponding to each message received from one or more human reviewers, and may include any one or combination of annotation data indicative of whether a message includes a complaint, annotation data indicative of whether the message includes a high risk complaint, data identifying a type of complaint corresponding to the message from a set of complaint types, and/or data identifying a complaint reason corresponding to the message from a set of complaint reasons. The annotation data may also include other types of annotation data as described herein or that may be relevant to accurate annotation of incoming customer messages.

For example, annotation data 210 may include annotation data received via execution of annotation tool unit 230. Annotation tool unit 230 may include computer programed instructions that cause the one or more processors 202 to execute an annotation process through which annotation data is received from one or more human reviewers. For example, annotation tool unit 230 may output one or more annotation interfaces including one or more interface elements or data entry regions through which annotation management system 200 may receive annotation data input from one or more human reviewers.

Statistical data 214 includes data resulting from analysis of the annotation data 210 as executed by annotation analysis unit 240. Annotation analysis unit 240 may include computer programed instructions that cause the one or more processors 202 to execute one or more types of statistical analysis on the annotation data associated with one or more messages. Annotation analysis unit 240 may perform one or more types of analysis on the annotation data 210. For example, annotation analysis unit 240 may include a reviewer metrics unit 242 and a model output metrics unit 244. Reviewer metrics unit 242 may determine, by analyzing annotation data received from one or more human reviewers, one or more metrics indicative of the consistency of the annotation data entered by the one or more human reviewers. For example, reviewer metrics unit 242 may determine one or more of an Intra-Rater Agreement metric ("reproducibility"), an Inter-Rater Agreement metric ("repeatability"), a Comparison to Reviewers metric (comparison to standards), a Stability metric (stability over time), and a Comparisons to Model Output metric (a metric indicative of a comparison to the output generated by automated analysis system 26 of FIG. 1, for example).

Model output metrics unit 244 may determine, by analyzing annotation data received from one or more human reviewers and machine learning model outputs generated by automated analysis system 26, one or more metrics indicative of the consistency and/or accuracy of the model outputs. For example, model output metrics unit 244 may generate any one or more of the metrics shown in Table 2:

TABLE 2

| Statistic | Definition |
|---|---|
| True positives | defined as model and 2 raters agree on outcome = 1 [true positives/total sample] |
| True negatives | defined as model and 2 raters agree on outcome = 0 [true negatives/total sample |
| False positives | defined as model = 1 and at least one rater or calibration outcome = 0 [false positives/total sample] |
| False negatives | defined as model = 0 and at least one rater outcome = 1 [false negatives/total sample] |
| Estimated % correctly assigned/identified | true positives + true negatives/over total sample |
| Event rate | True positives + false negatives/total population |

Annotation management system 200 may store any one or more of the metrics generated by reviewer metrics unit 242 and model output metrics unit 244 as statistical data 214. The precision rates, defined as True Positives/True Positives+False Positives, and recall rates, defined as True Positives/True Positives+False Negatives, are used to measure the accuracy of the model's decision making in comparison to the reviewer metrics. The false omission rate, defined as False Negatives/False Negatives+True Negatives, measures the error rate in the model's ability to capture complaints.

The model output metrics may further include other model output metrics, including, but not limited to, sensitivity, specificity, prevalence, detection rate, detection prevalence, balanced accuracy, precision, recall, F1 score, Cohens' Kappa, Concordance, Sommers D, Area under the ROC curve, Gini Coefficient, KS Statistic, Youden's J Index, and any other model output metric.

Message routing unit 220 may include computer programed instructions that cause the one or more processors 202 to execute a message routing process through which incoming messages are routed or assigned to one or more human reviewers. For example, message routing unit 220 may route or assign incoming messages to one or more human reviewers based on reviewer and/or message assignments made by a supervisor level reviewer (or other reviewer with reviewer and/or message assignment permissions) via one or more graphical user interfaces generated by annotation tool 230. The reviewer and/or message assignments may be stored in one or more both of message data 208 and/or reviewer data 212, for example. Message routing unit 220 may also be invoked at one or more points during the review process. For example, if first annotation data associated with a message received from a first reviewer does not agree with second annotation data associated with the message received from a second reviewer, the message may be routed to a supervisory reviewer for receipt of supervisory annotation data. Other possible mechanisms for routing the messages to one or more human reviewers are described her further detail herein, and it shall be understood that the disclosure is not limited in this respect.

Reporting unit 250 may include computer programed instructions that cause the one or more processors 202 to execute a report generation process through which one or more reports are generated in response to requests received from one or more human users. In addition, or alternatively, one or more reports may be generated automatically. For example, reporting unit 250 may allow one or more human users to request generation of one or more reports, and generate the reports in response to the request. Reporting unit may generate one or more reports based on user input received via one or more user interfaces generated by annotation tool unit 230. The reports may include any one or more of message data 208, annotation data 210, reviewer data 212, statistical data 214, and/or any data generated therefrom. For example, the reports may include charts, tables, and/or graphs illustrating any of the data stored in storage units 206 and/or generated by annotation analysis unit 240, such as graphs indicating trends over time, and calculated statistics associated with any of the data stored in storage units 208 or generated by any of the annotation processes carried out by message routing unit 220, annotation tool unit 230, annotation analysis unit 240 and/or reporting unit 250, and reviewer and/or model statistics.

Figure 2B:
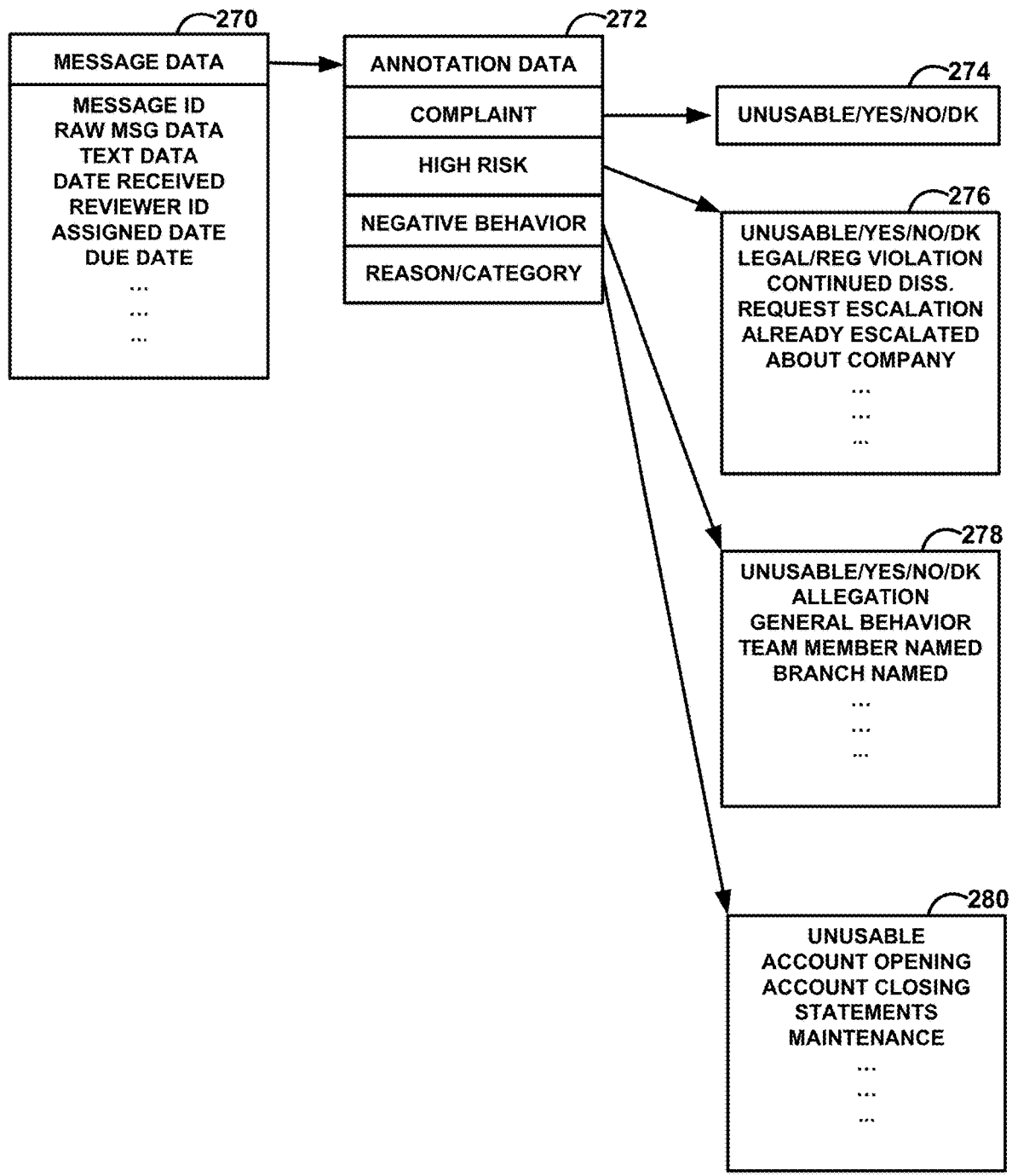
FIG. 2B shows a portion of an example annotation database, including an example message data table and an example annotation data table corresponding to a single message, in accordance with one or more techniques of this disclosure.

FIG. 2B shows a portion of an example annotation database 216, including an example message data table 270 and an example annotation data table 272 corresponding to a single message. Annotation database 216 includes a plurality of such message data tables 270 and associated annotation data tables 272. Each message data table corresponds to a different one of a plurality of messages. In this example, message data table 270 stores message data including a message ID associated with the message, raw message data associated with the message (e.g., the raw text or voice data), text data associated with the message, a date received, a reviewer II), an assigned date, a due date, and any other data relevant to annotation of the message. Message data table 270 may include one or more pointers to other tables in the annotation database, such as annotation data table 272. Annotation data table 272 includes a complaint field 274 that stores (or points to) annotation data indicative of whether the message includes a complaint, a high risk field 276 that stores annotation data indicative of whether the message includes a high risk complaint, a negative behavior description field 278 that stores annotation data indicative of whether the message includes a negative behavior description, and a reason/category field 280 that stores annotation data indicative of the reason/category associated with the message.

In some examples, the annotation data may further include annotation data indicative of whether the message includes a complaint and annotation data indicative of the type of complaint. As another example, the annotation data may include annotation data indicative of whether the message includes a high risk complaint, and annotation data indicative of the type of high risk complaint. As another example, the annotation data may include annotation data indicative of whether the message includes a negative behavior description, and annotation data indicative of the type of negative behavior description.

Figure 3:
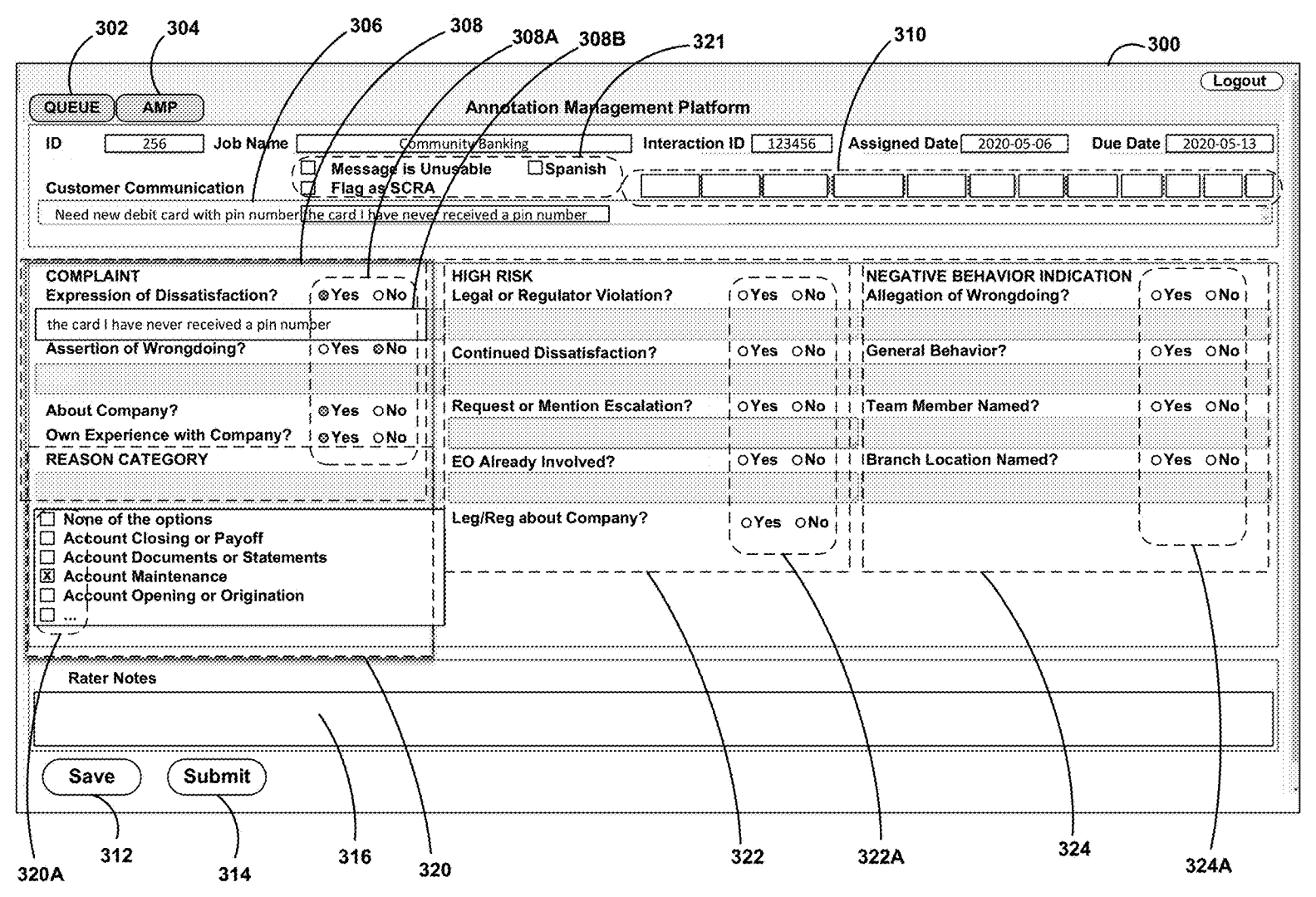

FIG. 3 is an example annotation interface 300 that may be output by annotation management system 200 of FIG. 2 and displayed on a computing device (such as agent desktop systems 24), and through which a human reviewer may enter annotation data associated with a message. Example annotation interface 300 may be generated by annotation interface unit 234 of annotation tool unit 230. It shall be understood that although a specific example of an annotation interface 300 is shown and described herein, that many alternative interfaces may be used to receive annotation data from one or more human reviewers, and that the disclosure is not limited in this respect.

Annotation interface 300 includes one or more text entry/editing fields and one or more graphical interface elements such as buttons, tabs, check boxes, pull-down menus, etc., through which a human reviewer may navigate the annotation process and enter annotation data associated with a message. For example, the user may navigate to a reviewer annotation queue interface (not shown in FIG. 3) by clicking on or activating annotation queue tab 302. Similarly, the reviewer may navigate to the annotation interface 300 by clicking on or activating the Annotation Management Platform (AMP) tab 304.

In the example of FIG. 3, a Message ID, a Job Name, an Interaction ID, an Assigned Date and a Due Date are automatically populated in their respective fields at the top of annotation interface 300. The Message ID is an identifier assigned to the particular message being annotated from the reviewer's message queue. The Job Name is the name of the project for which the message is associated. The Interaction ID is a unique identifier assigned to each customer communication. For example, the Interaction ID may refer to a particular telephone interaction between a customer and a human agent, a particular text message received by the message center 12 from a customer, etc. The Interaction ID is the is the join key that may be used to link the communication content with all other metadata associated with that communication. This includes metadata that is included at the time of ingestion (product, date, language, etc.) and metadata data that is created as a part of the annotation activities (flags, categories, word strings) and any other annotation data as described herein). The Assigned Date refers to the date the message was assigned to the reviewer's message queue. The Due Date refers to the target date by which the reviewer is to have completed annotation of the message. These fields allow for ease in reporting—fields are standardized across all source data, allowing for consistent annotation reporting as well as linking to applicable source data/model output.

A message text data field 306 is automatically populated with text data indicative of the message. In the example of FIG. 3, the test data comprises a string of characters, "Need new debit card with pin number the card I have never received a pin number". The text data string may be generated by user device 16A (see FIG. 1) as a part of a text-based message such as a text message, an email, or a social media message. In some examples, the message represents a voice message and the text data is generated by a voice-to-text engine configured to convert an audio message into text data. In any case, the text data indicative of the message may include one or more words, phrases, characters, or any combination thereof.

To begin the annotation process, the reviewer views the text data in the text data field 306. In some cases, the text data may be garbled or unintelligible in some way. For example, if a voice-to-text engine is unable to translate all or part of a voice message to text data, it may generate an "unknown" or "unk" output for those portions of the voice message it is unable to translate. If this includes the entire message or a significant portion of the message, the message may be unintelligible to the reviewer. In such examples, the reviewer may check the "Message is Unusable" checkbox in area 321 in the top portion of the annotation interface 300. As explained in more detail herein, if the Message is Unusable" checkbox is selected, the message is annotated as "unusable" in the annotation database and the next message in the reviewers message queue is displayed. In addition, the message may be routed to one or more other reviewers for further review and/or annotation as described herein below. In some examples, messages that are determined to be unusable may be excluded from model training or performance calculations, so as not to contaminate the data. In other examples, the information on whether messages are unusable may be analyzed to provide quantitate information regarding the preponderance of such messages in the data.

Similarly, if the text data displayed in text data field 306 was in a language other than the default language of the annotation interface (English in this example), the reviewer may check or select a check box indicative of the other language (Spanish in this example) in area 321. If the "Spanish" (or other language) checkbox is selected, the message is annotated as "Spanish" in the annotation database and the message is automatically routed to a reviewer fluent in Spanish (or other language), and the next message in the reviewer's message queue is displayed.

As another example, if the organization is a financial services institution, certain messages may be related to the Servicemembers Civil Relief Act (SCRA). The SCRA is a law designed to ease financial burdens on servicemembers during periods of military service. If the reviewer determines, based on the text data in text data field 306, that the message is related to an SCRA matter, the reviewer may check an "SCRA" checkbox in area 321 of the annotation interface 300. If the "SCRA" checkbox is selected, the annotation data for the message is annotated "SCRA" in the annotation database and annotation management system automatically routes the message to a reviewer with expertise in SCRA matters, and automatically display the next message in the reviewer's message queue on the annotation interface.

It shall be understood that the system could be expanded to other languages in addition to Spanish as described herein, and that the disclosure is not limited in this respect. For example, as part of the reviewer data stored by the annotation management system, each reviewer has a profile that may denote, for example, language skills sets and review location. The location information for a reviewer may be used by the annotation management system when routing complaints for review as some communications are required to be reviewed on-shore in the US (e.g., SCRA cases). The annotation management system may also include other skillsets to each reviewers profile such as designated expertise in certain business areas. The annotation management system may thus permit routing of messages based on any variables in the reviewer profile, and it shall be understood that the disclosure is not limited in this respect.

Example annotation interface 300 includes one or more annotation subwindows each corresponding to one or more annotation decisions associated with a message. The annotation decisions are made by the reviewer based on, in the example of FIG. 3, the text data presented in text data field 306. In this example, annotation interface 300 includes four subwindows each corresponding to a different one of four annotation decisions: a complaint subwindow 308, a high risk complaint subwindow 322, a negative behavior description subwindow 324, and a reason/category subwindow 320.

Example complaint subwindow 308 includes one or more interface elements by which a reviewer may input annotation data indicative of whether the message includes a complaint. For example, the reviewer makes a decision, based on the text data presented in text data field 306, whether the message includes a customer complaint, and inputs annotation data indicative of whether the message includes a customer complaint using complaint subwindow 308. In some examples, messages including a complaint may be associated with a relatively higher risk level than messages that do not include a complaint. In such examples, the annotation data associated with each message includes complaint annotation data indicative of whether the message includes a complaint. Automated message analysis system 26 may train a machine learning model using the complaint annotation data received by annotation management system 28 via annotation interface 300 to classify a message as including, or predict a likelihood that a message includes, a complaint. Automated message analysis system 26 may route complaint messages to another system to address and/or resolve the complaint.

Example complaint subwindow 308 includes one or more interface elements, such as Yes/No selectors 308A, by which a reviewer may input annotation data regarding whether the message includes a customer complaint. Complaints may be categorized in different ways depending upon the organization or industry. In the example of FIG. 3, the organization is a financial institution and complaint subwindow 308 includes one or more interface elements, such as Yes/No selectors 308A, by which the reviewer may input complaint annotation data indicative of whether the message includes one or more types of customer complaints, such as whether the message includes a complaint (or any "expression of dissatisfaction"), whether the message includes a complaint concerning an assertion of wrongdoing by a person or location associated with the organization, whether the message includes a complaint about the organization, and/or whether the message includes a complaint concerning the customer's own experience with the organization and/or whether the message includes a complaint concerning another person's experience with the organization.

As another example, complaint subwindow 308 may also include a text field 308B in which the reviewer may enter (such as by using their mouse or other text selection tool) a portion of the message text data that includes the complaint language. In this example, the reviewer has selected "the card I have never received a pin number" in text data field 306. Annotation management system 200 populates the highlighted text into text field 308B in the complaint subwindow 308. This complaint language text data is saved to the annotation database 206 as part of the annotation data for the message.

In some examples, the annotation management system may permit the reviewer to select one or more words in the communication that indicated or provide rationale for the reviewer's decision as to whether the communication includes a complaint. These one or more words or strings of words may be stored as metadata that can be used for data training or performance analysis. The one or more words or word strings may be sequential or non-sequential. The non-sequential words in the communication may be selected separately and may be concatenated in the text data metadata field 306.

Example reason/category subwindow 320 may include one or more interface elements by which the reviewer may input annotation data indicative of the reason for the customer communication or the category associated with the customer communication. In such examples, the annotation data associated with each message includes reason/category annotation data indicative of the reason for the message or the category associated with the message. For example, the reviewer makes a decision, based on the text data presented in text data field 306, regarding a reason or category associated with the message, and inputs annotation data indicative of the reason or category associated with the message using reason/category subwindow 320. Automated message analysis system 26 may train a machine learning model using the reason or category annotation data received by annotation management system 28 via annotation interface 300 to classify a message as relating to, or to predict a likelihood that a message relates to, one or more reasons or categories. Automated message analysis system 26 may route messages depending upon the reason or category to one or more different systems or persons specifically designed or trained to address and/or resolve certain reasons or categories of customer communications.

For example, reason/category subwindow 320 includes one or more interface elements, such as check boxes 320A, by which a reviewer may input annotation data regarding the reason or category associated with the message. In the example of FIG. 3, the organization is a financial institution and reason/category subwindow 320 includes one or more interface elements, such as check boxes 320A, by which the reviewer may select from one or more reasons or categories including "Account Closing or Payoff", "Account Documents or Statements", "Account Maintenance", "Account Opening or Origination" etc.

Example high risk complaint subwindow 322 includes one or more interface elements by which a reviewer may input annotation data indicative of whether the message includes a high risk complaint. In some examples, certain types of complaint messages may be associated with a relatively higher risk level than messages that are not associated those types of complaint messages. In such examples, the annotation data associated with each message includes high risk annotation data indicative of whether the message includes a high risk complaint. Automated message analysis system 26 may train a machine learning model based on the high risk annotation data received by annotation management system 28 via annotation interface 300 to classify a message as including, or predict a likelihood that a message includes, a high risk complaint.

For example, high risk subwindow 322 includes one or more interface elements, such as Yes/No selectors 322A, by which a reviewer may input annotation data regarding whether the message includes a high risk complaint. A high risk complaint is associated with a category of complaint that is associated with a relatively higher risk level than a lower risk category of complaint. High risk complaints may be categorized in different ways depending upon the organization or industry. In the example of FIG. 3, the organization is a financial institution and the high risk subwindow 322 includes may include one or more interface elements, such as Yes/No selectors 322, by which the reviewer may input high risk annotation data indicative of whether the message includes one or more types of high risk complaint, such as whether the message includes a high risk complaint concerning a legal or regulatory violation, whether the message includes a high risk complaint concerning a continued customer dissatisfaction, whether the message includes a high the risk complaint including a mention or request for escalation, whether the message includes a high risk complaint concerning a legal or regulatory violation by the organization, and/or whether the message includes a high risk complaint that has been previously escalated.

Example annotation interface 300 further includes negative behavior description subwindow 324. Negative behavior description subwindow 324 includes one or more interface elements by which a reviewer may input annotation data indicative of whether the message includes a negative behavior description about a person and/or a location associated with the organization. In some examples, complaint messages associated with annotation data indicative of a negative behavior description may be associated with a relatively higher risk level than messages that are not associated with a negative behavior description. Automated message analysis system 26 may train a machine learning model based on the negative description annotation data received by annotation management system 28 to classify as message as including, or predict a likelihood that a message includes, a negative behavior description. Automated message analysis system 26 may then escalate the message with the negative behavior description to another system (e.g., when the negative behavior description is about a specific, named person or a specific, named location associated with the organization and/or when the negative behavior description comprises an allegation of unethical behavior) for proper addressing and resolution of the negative behavior.

For example, negative behavior description subwindow 324 may include one or more interface elements, such as Yes/No selectors as shown in FIG. 3, by which the reviewer may input negative behavior description annotation data indicative of whether the message includes one or more types of negative behavior descriptions, such as an allegation of wrongdoing by a person or location associated with the organization, whether the message includes a general negative behavior description regarding a person or location associated with the organization, whether the message names a specific, named person or a specific, named branch or location associated with the organization.

Annotation interface 300 may further include a text entry field 316 by which a reviewer may enter notes regarding the message. For example, notes can be used to highlight questions or comments for a supervisor level reviewer's consideration. It may be also used in certain circumstances as a way to create an ad hoc flag or indicator. For example, if the institution would like to review a sample of complaints containing certain words or phrases (such as "COVID-19" or "hurricane") were mentioned or if the complaint was the result of a natural disaster, a hashtag or set of standard words could be designated to populate that field. As another example, if a communication is marked as unusable, then a comment may be required in that instance.

Annotation interface 300 may further include, for example, "Save" and "Submit" buttons 312, 314 respectively. Selection of the "Save" button 312 may permit a reviewer to save the annotation data entered into annotation interface. Selection of the "Submit" button 314 is an indication that the reviewer has completed annotation of the message. In some examples, when a reviewer has submitted annotation data for a message, annotation management system may route the message to the next reviewer assigned to the message in accordance with the annotation process associated with the message.

In some examples, the annotation management system may provide supervisor level reviewers, oversight and arbitration level reviewers with the ability to view trained machine learning model predictions for any communications that have model output available. The model predictions may be included on the annotation interface or on a different interface view. In some examples, first level reviewers cannot see model predictions. Model predictions may be available where models have been developed for a specific outcome, line of business and/or channel. This information can be compared to reviewer outcomes when available. Regardless of whether a model outcome is available, the annotated data can be used for model training or, in the case of existing models, model improvement.

A reviewer may navigate to a reviewer annotation queue interface (not shown in FIG. 3) by clicking on or activating annotation queue tab 302. The reviewer annotation queue may include, for example, a selectable list of messages assigned to the reviewer, including, for reach message, a message id, message status (e.g., pending, saved, submitted, etc.), the date received, the date the message was assigned to the reviewer, and any other information related to each message in the reviewer annotation queue. To begin annotating a message (or to continue annotation of a previously saved and/or partially annotated message), a reviewer may select a message from their associated review queue. Annotation management system 200 may then cause an annotation interface for the selected message, such as annotation interface 300, to be displayed on the reviewer's agent desktop 24.

Figure 4:
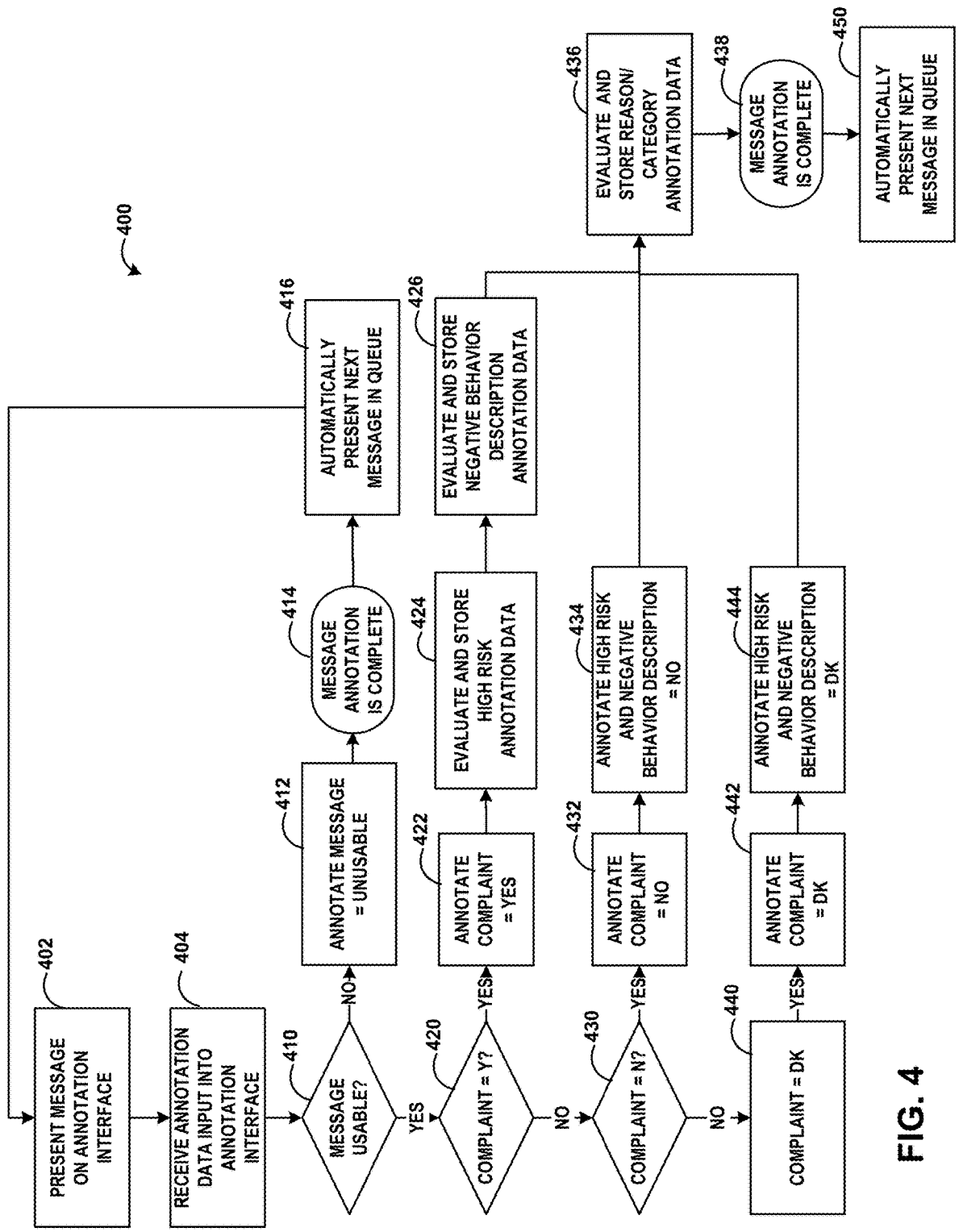
FIG. 4 is a flowchart illustrating an example annotation process by which an annotation management system may receive and store annotation data input by a reviewer into an annotation interface, in accordance with one or more techniques of this disclosure.

FIG. 4 is a flowchart illustrating an example annotation process (400) by which an annotation management system, such as annotation management system 200 as shown in FIG. 2, may receive and store annotation data input by a reviewer into an annotation interface, such as annotation interface 300 as shown in FIG. 3. As discussed above, each message may be assigned to two or more human reviewers for entry of annotation data associated with the message. The reviewers may include any combination of reviewer types, such as reviewer, supervisor, arbitrator, and/or oversight level reviewers. The annotation data may include, for example, annotation data indicative of whether the message is unusable, annotation data indicative of whether the message includes a complaint, annotation data indicative of whether the message includes a high risk complaint, annotation data indicative of whether the message includes a negative behavior description, and/or annotation data indicative of a reason or category associated with the message.

To begin an annotation process (400) for a message, annotation management system 200 generates, for display on a reviewer computing device, an annotation interface such as annotation interface 300 as shown in FIG. 3 (402). The annotation interface presents text data corresponding to the message (such as in text data field 306 as shown in FIG. 3). Based on the text data presented in the annotation interface, a human reviewer makes one or more decisions concerning the message and inputs corresponding annotation data into the annotation interface. Annotation management system 200 receives the annotation data input into the annotation interface by the reviewer (404). For example, annotation management system 200 may receive annotation data indicative of whether the message is unusable, annotation data indicative of whether the message includes a complaint, annotation data indicative of whether the message includes a high risk complaint, annotation data indicative of whether the message includes a negative behavior description, and/or annotation indicative of a reason/category associated with the message.

If the annotation data received by annotation management system indicates that the message is unusable (410), annotation management system stores annotation data indicative that the message is unusable in the annotation database (such as annotation database 206 as shown in FIG. 2B) (412). In some examples, if a message is unusable, annotation management system stores annotation data indicative that the message is unusable with respect to each decision element in the annotation data corresponding to the message. For example, annotation management system stores annotation data indicative the message as "unusable" with respect to each of the complaint decision element, the high risk complaint decision element, the negative behavior description decision element, and the reason/category decision element (for example, "Unusable" in each of annotation data entry fields 274, 276, 278 and 280 of FIG. 2B).

When the message is unusable, no further information concerning the message can be gleaned by the human reviewer, and the annotation process for the message is complete. Annotation management system then automatically presents, for display on the annotation management interface of the reviewer computing device, the next message in the reviewer's message queue (414).

If the annotation data received by annotation management system indicates that the message is usable (410), annotation management system determines whether the received annotation data indicates that the message includes a complaint (420). If the annotation data indicates that the message includes a complaint (YES branch of 420), annotation management system stores annotation data indicative that the message includes a complaint in the annotation database. For example, annotation management system may store a "Yes" in annotation data field 274 as shown in FIG. 2B) (422).

Annotation management system also determines and stores annotation data indicative whether the received annotation data indicates that the message includes a high risk complaint (424). For example, if the received annotation data indicates that the message includes a high risk complaint, annotation management system may store a "Yes" in annotation data field 276. Annotation management system may also store annotation data concerning the type of high risk complaint in annotation data field 276 corresponding to the type of high risk complaint indicated in the received annotation data.

Annotation management system also determines and stores annotation data indicative whether the received annotation data indicates that the message includes a negative behavior description (426). For example, if the received annotation data indicates that the message includes a negative behavior description, annotation management system may store a "Yes" in annotation data field 278. Annotation management system may also store annotation data concerning the type of negative behavior description in annotation data field 276 corresponding to the type of negative behavior description indicated in the received annotation data.

Annotation management system may also determine and store annotation data indicative of the reason or category associated with the message (428). For example, annotation management system may store annotation data concerning the reason or category associated with the message indicated in the received annotation data in annotation data field 280.

At this point, the annotation process for a message that includes a complaint is complete. Annotation management system may then automatically present, for display on the annotation management interface of the reviewer computing device, the next message in the reviewer's message queue (450).

If the annotation data received by the annotation management system indicates that the message does not include a complaint (430), annotation management system stores annotation data for the message indicative that the message does not include a complaint in annotation database (432). For example, annotation management system may store "No" in each of data entry fields 274, 276, and 278 as shown in FIG. 2B.

Annotation management system may also determine and store annotation data indicative of the reason or category associated with the message (428). For example, annotation management system may store annotation data concerning the reason or category associated with the message indicated in the received annotation data in annotation data field 280.

At this point, the annotation process for a message that does not include a complaint is complete. Annotation management system may then automatically present, for display on the annotation management interface of the reviewer computing device, the next message in the reviewer's message queue (450).

In some examples, the annotation data received by the annotation management system may indicate uncertainty as to whether the message includes a high risk complaint or a negative behavior description (440). For example, an interface element corresponding to the decision "Don't Know" may be presented on the annotation interface. If the annotation data received by the annotation management system indicates uncertainty as to whether the message includes a complaint, annotation management system stores annotation data for the message indicative of uncertainty as to whether the message includes a complaint in annotation database. For example, annotation management system may store "Don't Know" or "DK" in each of data entry fields 274 and 276, and 278 as shown in FIG. 2B. In other examples, the system may not implement the "Don't Know" option, in which case the reviewer would be required to choose whether the message includes a complaint or not and the process steps corresponding to the DK option would not be included.

Annotation management system may also determine and store annotation data indicative of the reason or category associated with the message (428). For example, annotation management system may store annotation data concerning the reason or category associated with the message indicated in the received annotation data in annotation data field 280.

At this point, the annotation process for a "DK" message is complete. Annotation management system may then automatically present, for display on the annotation management interface of the reviewer computing device, the next message in the reviewer's message queue (450).

FIGS. 5A-5F are flow diagrams showing example processes by which an annotation management system may route a message to one or more reviewers for receipt of annotation data associated with the message, in accordance with one or more techniques of this disclosure. The example annotation processes shown in FIGS. 5A-5F illustrate how a message may be routed to one or more human reviewers having different reviewer permission levels for receipt of annotation data associated with a message. The example reviewer permission levels include a reviewer permission level (Reviewer 1 and Reviewer 2), a supervisor permission level (Supervisor), an oversight permission level (Oversight) and an arbitration permission level (Arbitration).

Figure 5A:
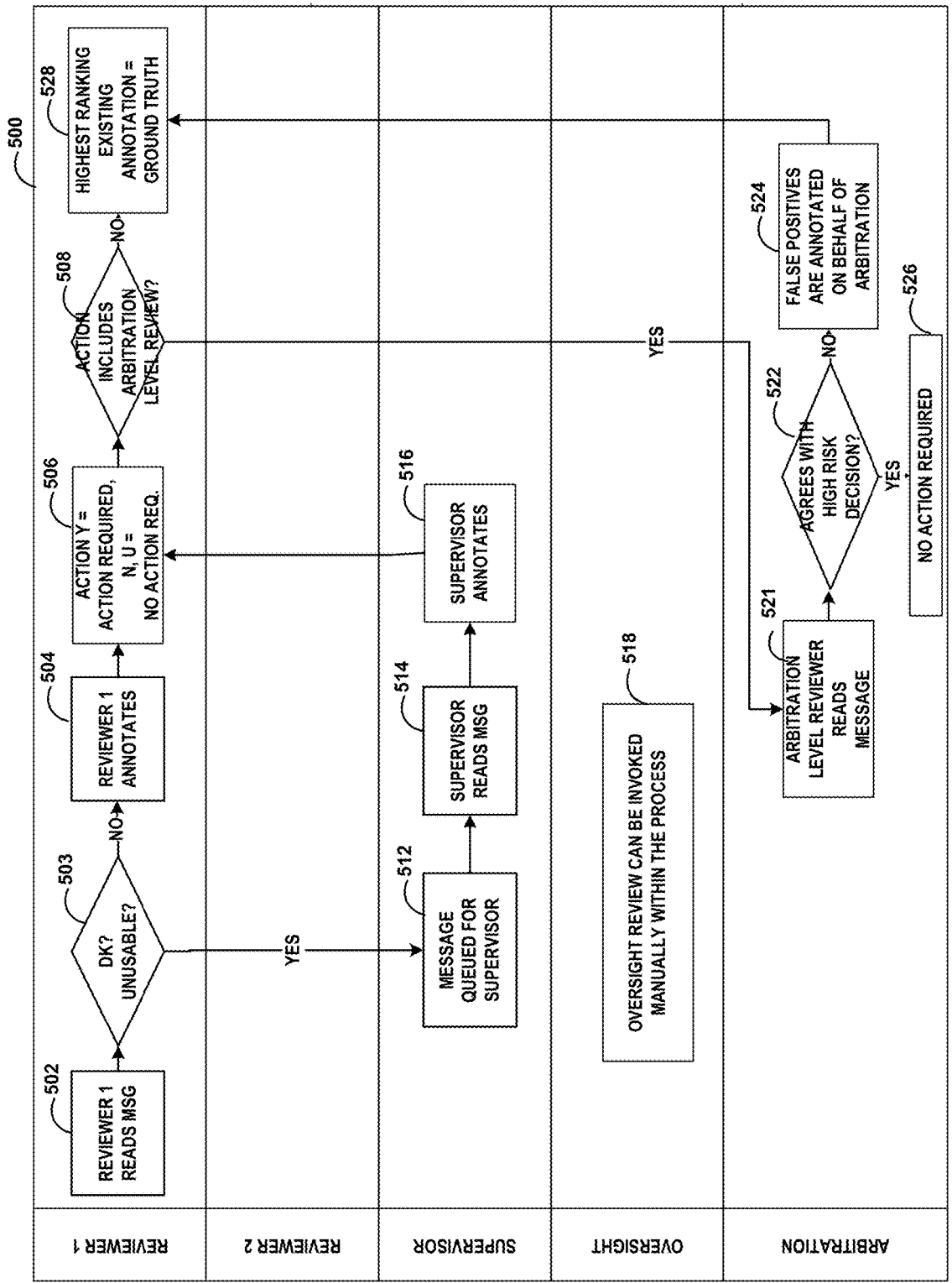
FIGS. 5A-5F are flow diagrams showing example processes through which an annotation management tool may route a message to one or more reviewers for receipt of annotation data associated with the message, in accordance with one or more techniques of this disclosure.

In general, in the example annotation process of FIG. 5A (500), a message is routed to at least one human reviewer for receipt of annotation data associated with the message. In the example annotation process of FIG. 5B (510), a message is routed to at least two human reviewers for receipt of annotation data associated with the message. In the example annotation process of FIG. 5C (520), a message is routed to at least two human reviewers for receipt of annotation data associated with the message. In the example annotation process of FIG. 5D (530), a message is routed to at least three human reviewers for receipt of annotation data associated with the message. In the example annotation process of FIG. 5E (540), a message is routed to at least four human reviewers for receipt of annotation data associated with the message. In the example annotation process of FIG. 5F (550), a message is routed to at least three human reviewers for receipt of annotation data associated with the message.

Referring again to the example annotation process of FIG. 5A (500), a message is routed to at least one human reviewer (Reviewer 1) for receipt of annotation data associated with the message (502). The at least one human reviewer has a first reviewer permission level ("reviewer" in this example). If the at least one human reviewer determines that the message is usable (NO branch of 503), the reviewer annotates the message with annotation data indicative of whether the message includes a complaint, whether the message includes a high risk complaint, whether the message includes a negative behavior description, and/or the reason/category associated with the message (504).

If the at least one human reviewer annotates the message as "Don't Know" or "Unusable" (YES branch of 503), the message is routed to a second human reviewer having a second reviewer permission level that is relatively higher than the first reviewer permission level (512). In this example, the second reviewer permission level includes a "supervisor" permission level. The second human reviewer reviews the message (514) and annotates the message with annotation data indicative as to whether the message is unusable, or as to whether the message includes a complaint (516). Annotation management system stores the annotation data entered by both the at least one human reviewer or the second human reviewer in the annotation database (506).

Annotation management system further determines whether the annotation for the message requires further review by a third human reviewer having an arbitration reviewer permission level. If not (NO branch of 508), annotation management system determines which of the received annotation data associated with the message should be saved as the "ground truth" annotation data for the message (528). For example, if the message was only routed to Reviewer 1, the annotation data entered by Reviewer 1 would be stored as the ground truth annotation data associated with the message. If the message was routed to a first reviewer having a first reviewer permission level (e.g., Reviewer 1) and to a second reviewer having a second reviewer permission level that is relatively higher than the first reviewer permission level (e.g., Supervisor), the annotation data entered by the reviewer having the relatively higher permission level will be saved as the ground truth annotation data associated with the message. In this example, the annotation data entered by the Supervisor would be saved as the ground truth annotation data.

Annotation management system further determines whether the annotation data for the message requires further review by a third human reviewer having an arbitration reviewer permission level. If so (YES branch of 508), annotation management system routes the message to a reviewer having an arbitration reviewer permission level (Arbitration). The Arbitration reviewer reviews the message (521) and enters annotation data indicative of whether the message includes a high risk complaint. If the arbitrator agrees with the annotation data indicative that the message includes a high risk complaint (YES branch of 522) the arbitrator does not add any further information to the annotation data (526). If the arbitrator does not agree with the annotation data indicative that the message includes a high risk complaint (NO branch of 522), the arbitrator adds a false positive annotation to the incorrect annotation data (526) from either Reviewer 1 or Supervisor, or both.

Annotation management system then determines which of the received annotation data associated with the message should be saved as the "ground truth" annotation data for the message (528).

Figure 5B:
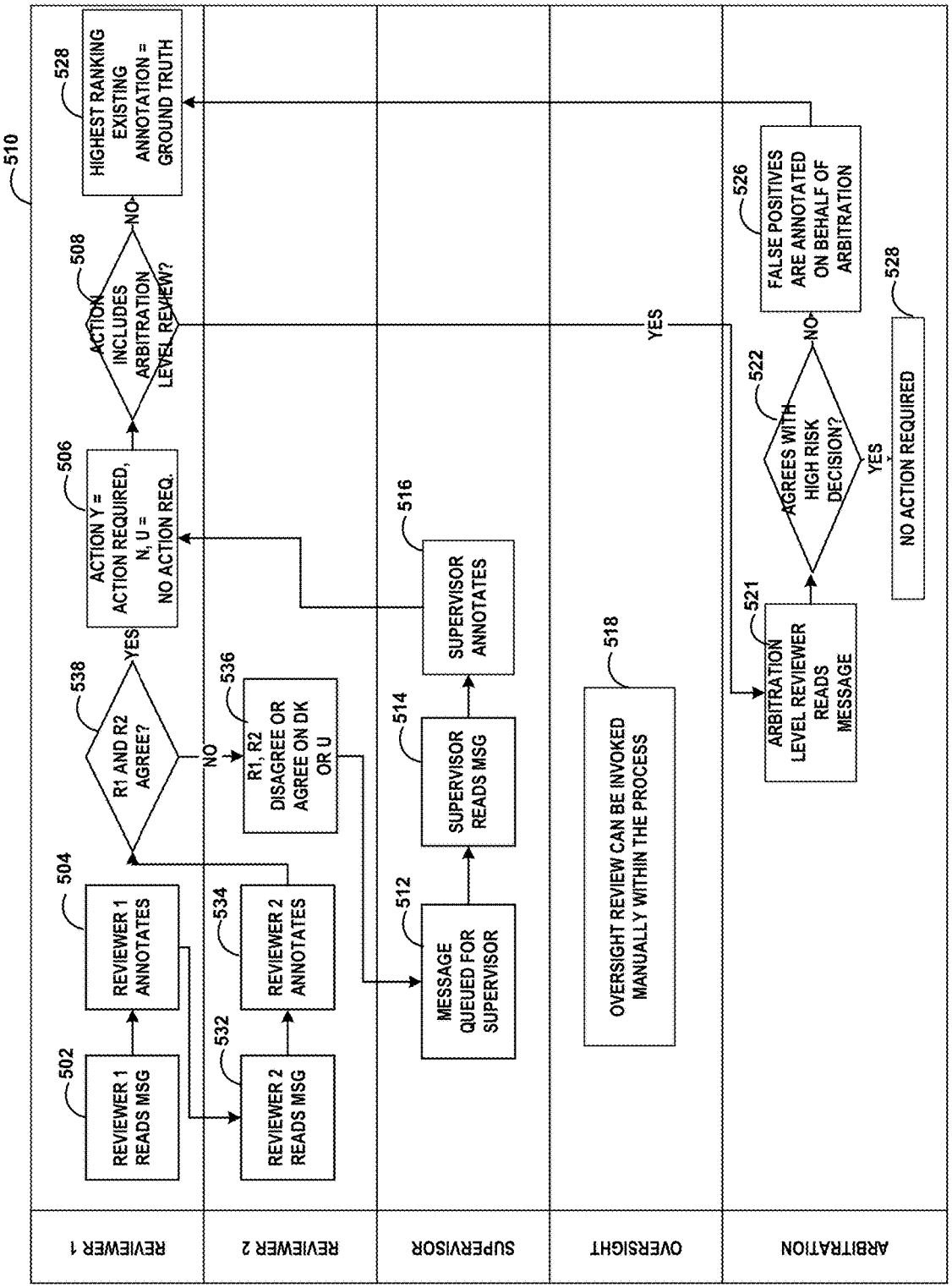

In the example annotation process of FIG. 5B (510), a message is routed to at least two human reviewers for receipt of annotation data associated with the message. Each of the at least two human reviewers have the first reviewer permission level ("reviewer" in this example). The message is first routed to the first reviewer having the first reviewer permission level for receipt of first reviewer annotation data (502, 504). The message is then routed to the second human reviewer having the first reviewer permission level for receipt of second reviewer annotation data (532, 534).

If the annotation data received from the first and second human reviewers agree (538), the process continues as described above with respect to FIG. 5A (e.g., process steps 506, 508, 521, 522, 524, 526, and 528). If the annotation data received from the first and second human reviewers does not agree as to whether the message includes a complaint, or they disagree on whether the message is unusable (NO branch of 538), the message is routed to a third reviewer having a second reviewer permission level that is relatively higher than the first reviewer permission level (512). The third reviewer having the second reviewer permission level reviews and annotates the message (516).

When all reviewers in the process have input their respective annotation data, annotation management system determines which of the received annotation data associated with the message should be saved as the "ground truth" annotation data for the message (528). For example, if the first reviewer annotation and the second reviewer annotation agree, that annotation data will be saved as the ground truth annotation data. If the message is routed to a reviewer with supervisor reviewer permission level, the annotation data entered by the supervisory level reviewer will be saved as the ground truth annotation data.

Figure 5C:
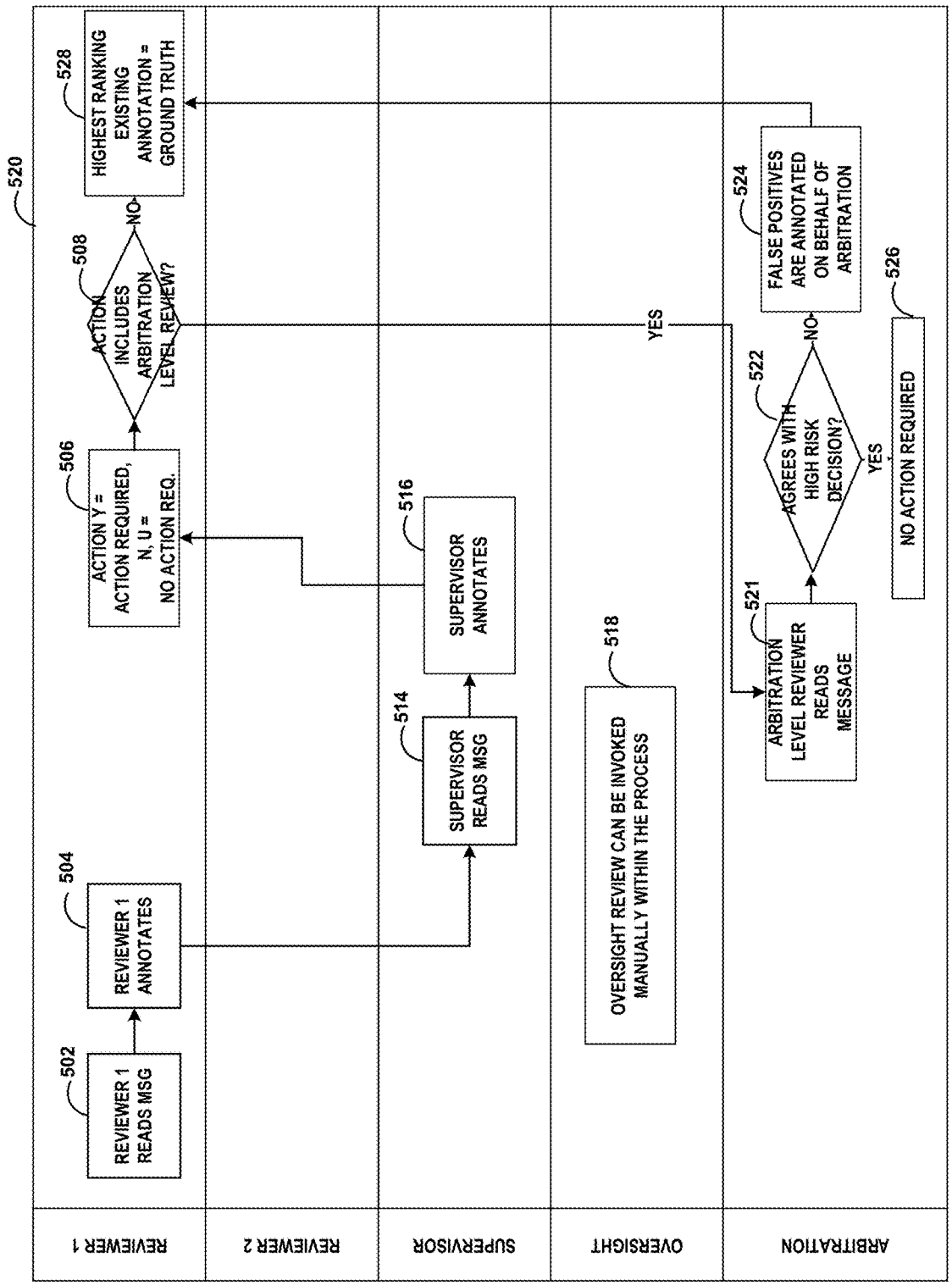

In the example annotation process of FIG. 5C (520), a message is routed to at least two human reviewers for receipt of annotation data associated with the message. In this example, a first reviewer of the at least two human reviewers has a first reviewer permission level (Reviewer 1) and a second reviewer of the at least two human reviewers has a second reviewer permission level (Supervisor), wherein the second permission level is relatively higher than the first permission level. The message is first routed to the first reviewer having the first reviewer permission level for receipt of first reviewer annotation data (502, 504). The message is then routed to the second human reviewer having the supervisor reviewer permission level for receipt of second reviewer annotation data (514, 516).

When the annotation data from both the first and second human reviewers has been received, the process continues as described above with respect to FIG. 5A (e.g., process steps 506, 508, 521, 522, 524, 526, and 528).

Figure 5D:
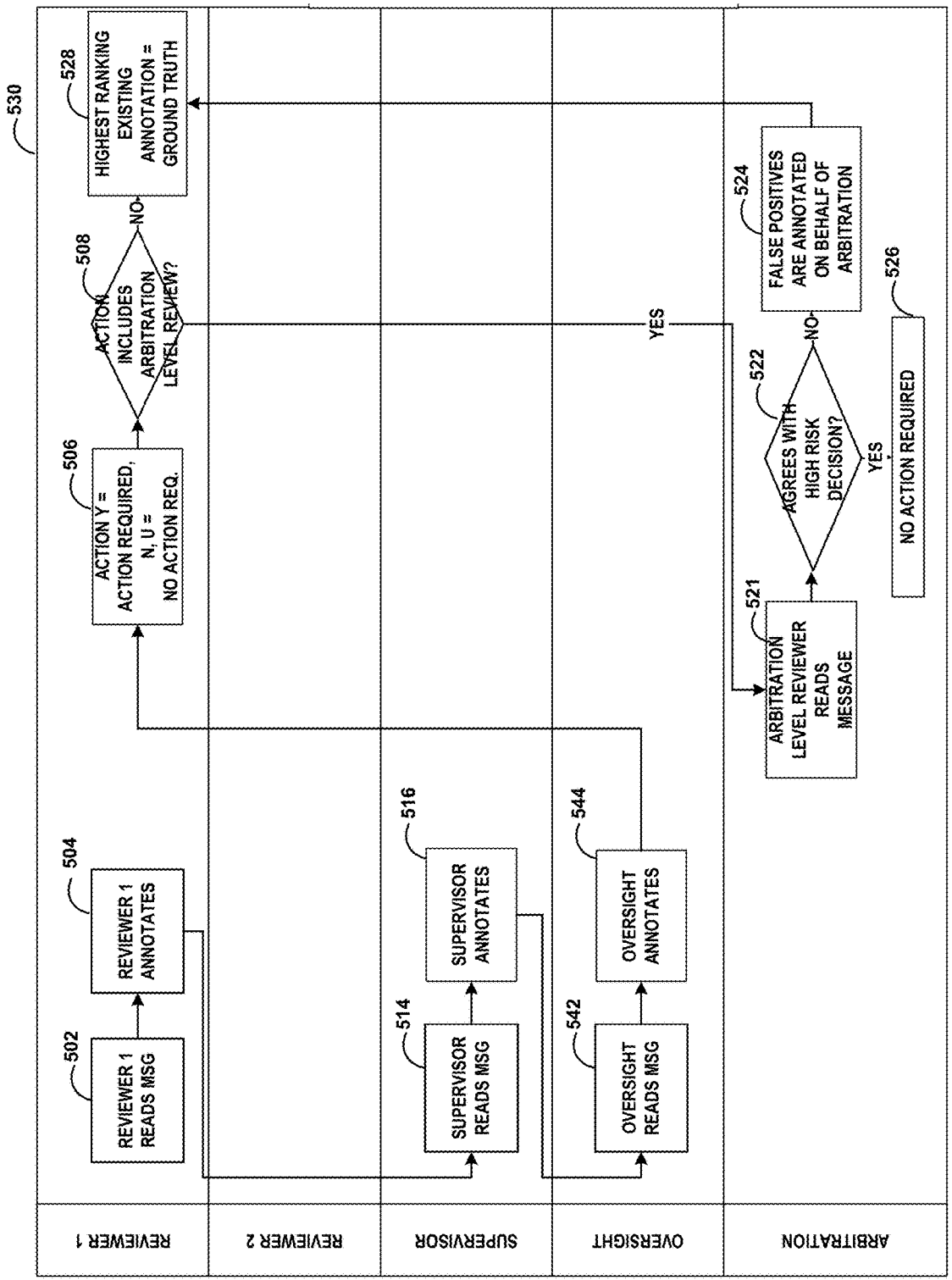

In the example annotation process of FIG. 5D (530), a message is routed to at least three human reviewers for receipt of annotation data associated with the message. In this example, a first human reviewer has a first reviewer permission level (Reviewer 1), a second human reviewer has a second reviewer permission level (Supervisor), and a third human reviewer has a third reviewer permission level (Oversight). The message is first routed to the first reviewer having the first reviewer permission level for receipt of first reviewer annotation data (502, 504). The message is then routed to the second human reviewer having the supervisor reviewer permission level for receipt of second reviewer annotation data (514, 516). The message is then routed to the third human reviewer having the oversight level reviewer permission level for receipt of third reviewer annotation data (542, 544).

When the annotation data from both the first, second, and third human reviewers has been received, the process continues as described above with respect to FIG. 5A (e.g., process steps 506, 508, 521, 522, 524, 526, and 528). In this example, the highest ranking annotation data, the annotation data received from the second reviewer having the supervisor reviewer permission level is stored as the ground truth annotation data. As mentioned above, in some examples, oversight and arbitration level reviewers may augment the annotation data, but do not necessarily override the ground truth annotation data.

Figure 5E:
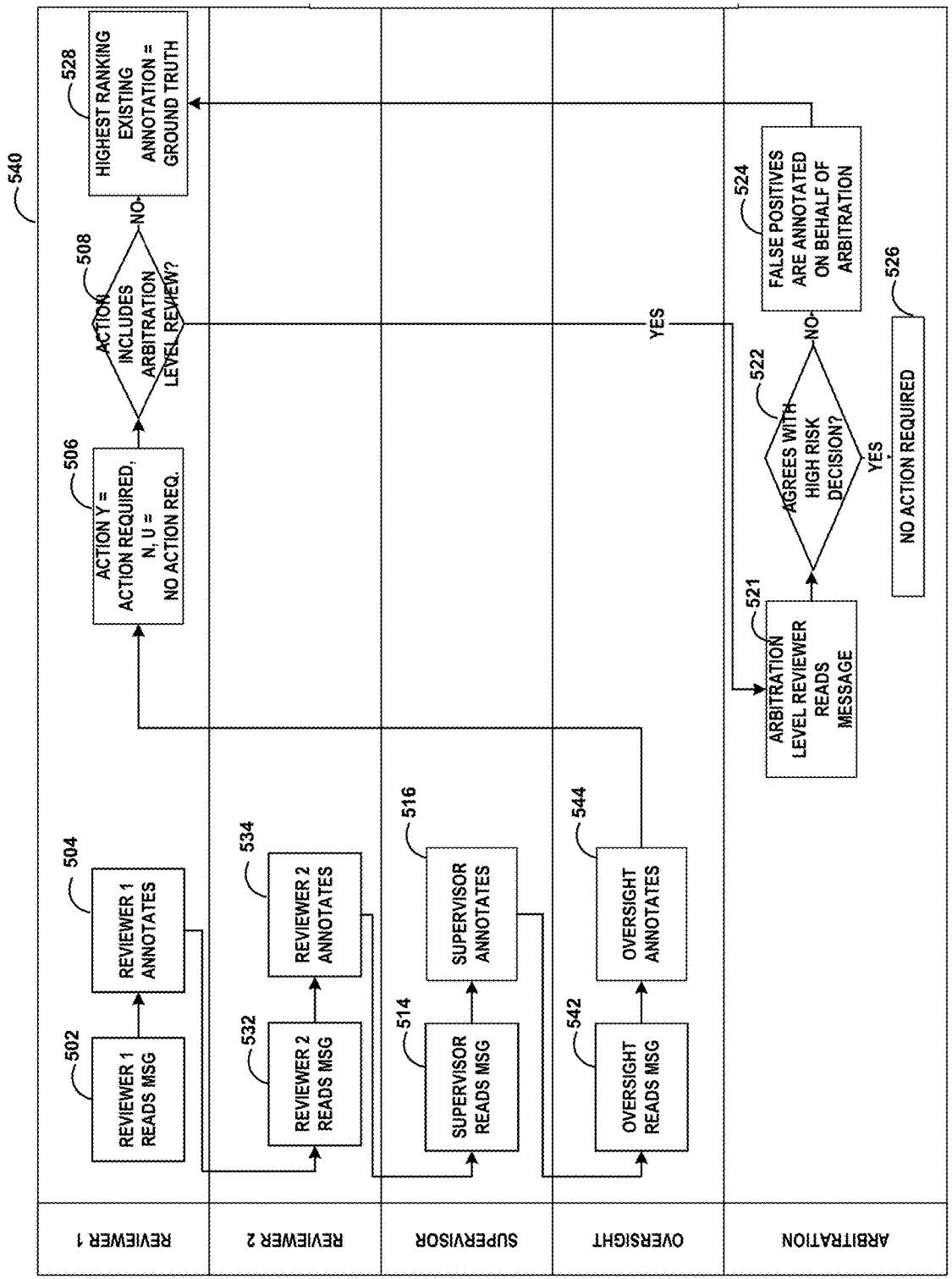

In the example annotation process of FIG. 5E (540), a message is routed to at least four human reviewers for receipt of annotation data associated with the message. In this example, a first human reviewer has a first reviewer permission level (Reviewer 1), a second human reviewer has the first reviewer permission level (Reviewer 2), a third human reviewer has a second reviewer permission level (Supervisor) and a fourth human reviewer has a third reviewer permission level. The message is routed to the first reviewer having the first reviewer permission level for receipt of first reviewer annotation data (502, 504). The message is routed to the second reviewer having the first reviewer permission level for receipt of second reviewer annotation data (532, 534). The message is routed to the third human reviewer having the supervisor reviewer permission level for receipt of third reviewer annotation data (514, 516). The message is routed to the fourth human reviewer having the oversight level reviewer permission level for receipt of third reviewer annotation data (542, 544).

When the annotation data from both the first, second, third, and fourth human reviewers has been received, the process continues as described above with respect to FIG. 5A (e.g., process steps 506, 508, 521, 522, 524, 526, and 528). In this example, the highest ranking annotation data that may be set as ground truth annotation data (in this example the annotation data received from the third human reviewer having the supervisor reviewer permission level) is stored as the ground truth annotation data. As mentioned above, in some examples, oversight and arbitration level reviewers may augment the annotation data, but do not necessarily override the ground truth annotation data.

Figure 5F:
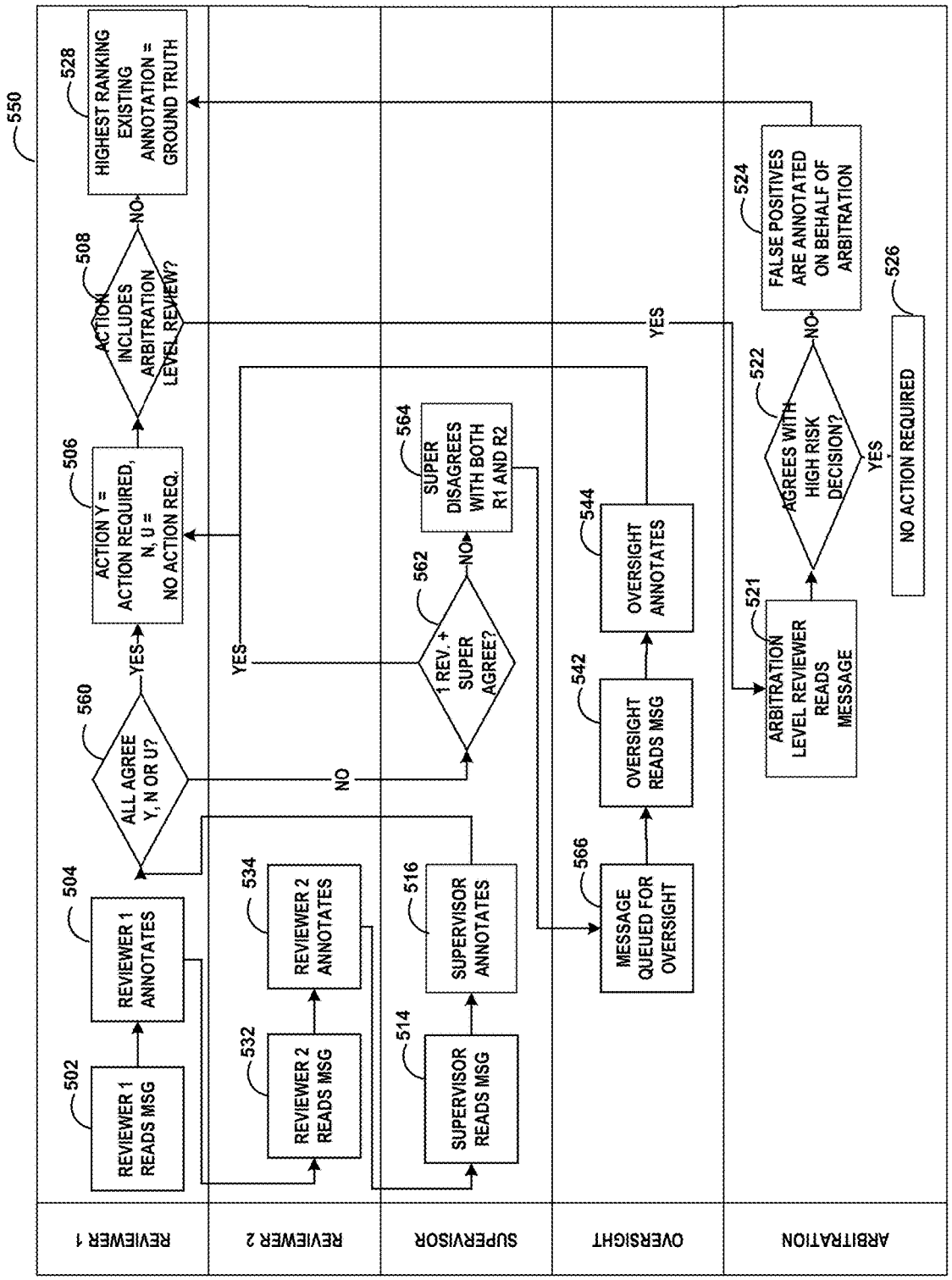

In the example annotation process of FIG. 5F (550), a message is routed to at least three human reviewers for receipt of annotation data associated with the message. In this example, a first human reviewer has a first reviewer permission level (Reviewer 1), a second human reviewer has the first reviewer permission level (Reviewer 2), and a third human reviewer has a second reviewer permission level (Supervisor). The message is routed to the first reviewer having the first reviewer permission level for receipt of first reviewer annotation data (502, 504). The message is routed to the second reviewer having the first reviewer permission level for receipt of second reviewer annotation data (532, 534). The message is routed to the third human reviewer having the supervisor reviewer permission level for receipt of third reviewer annotation data (514, 516). If the annotation management system determines that the annotation data received from the first, second, and third reviewers agrees (YES branch of 560), the process continues as described above with respect to FIG. 5A (e.g., process steps 506, 508, 521, 522, 524, 526, and 528).

If the annotation management system determines that the annotation data received from the first, second, and third reviewers do not agree (NO branch of 560), annotation management system determines whether one of the first reviewer annotation or the second reviewer annotation data agrees with the third reviewer annotation data (562). If so (YES branch of 562), the process continues as described above with respect to FIG. 5A (e.g., process steps 506, 508, 521, 522, 524, 526, and 528). If not, the annotation management system determines that the first and second reviewer annotation data disagrees with the third reviewer annotation data (564). The message is routed to the fourth human reviewer having the oversight reviewer permission level for receipt of fourth reviewer annotation data (566, 542, 544). When the fourth reviewer annotation data has been received, the process continues as described above with respect to FIG. 5A (e.g., process steps 506, 508, 521, 522, 524, 526, and 528). In this example, annotation management system saves the annotation data received from the reviewer having the highest reviewer permission level (the annotation data received from the third human reviewer having the supervisor reviewer permission level) as ground truth annotation data for the message. As mentioned above, in some examples, oversight and arbitration level reviewers may augment the annotation data, but do not necessarily override the ground truth annotation data.

Figure 6:
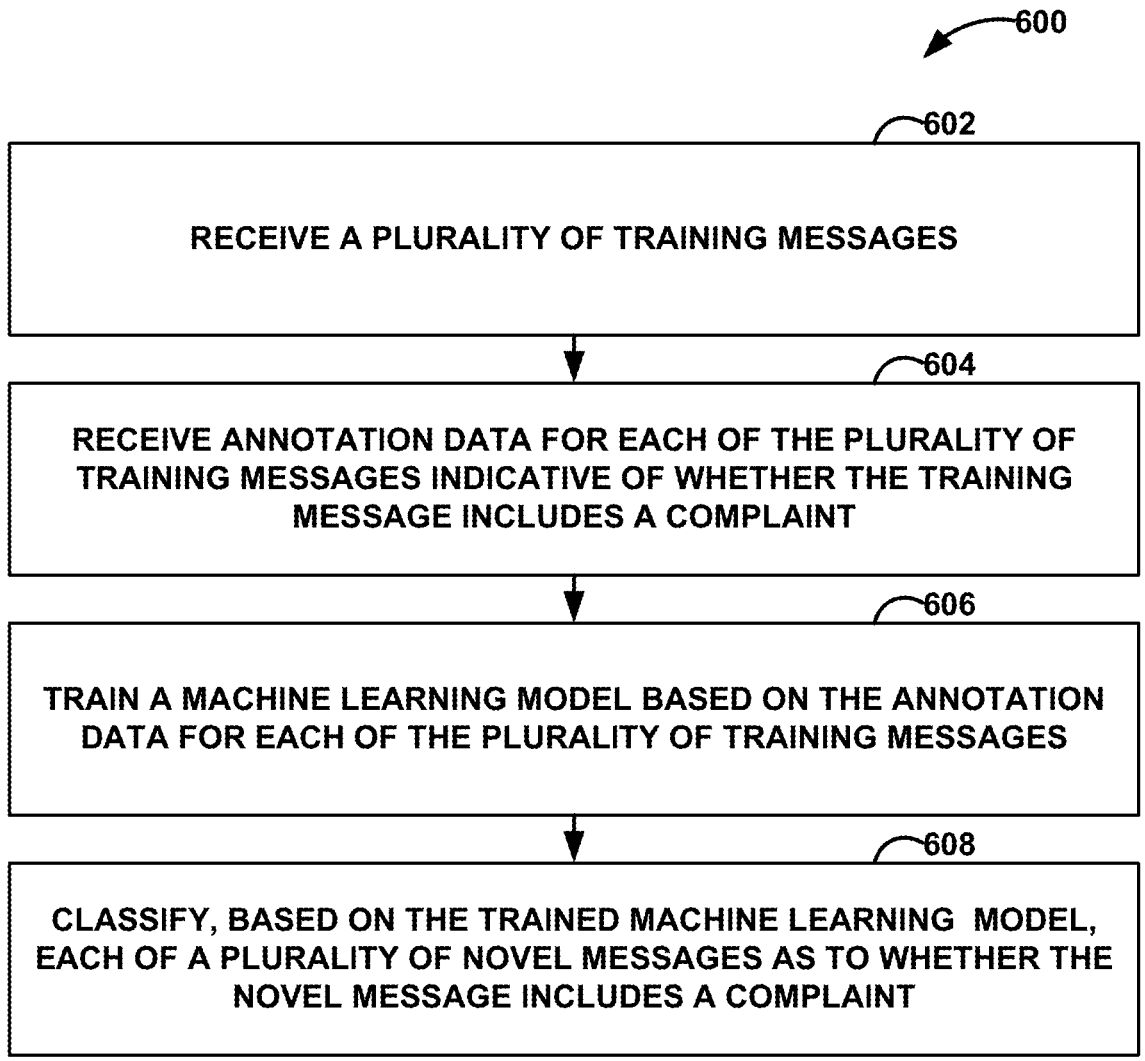
FIG. 6 is a flow diagram showing an example process by which an annotation management system may train a machine learning model to determine whether a message includes a complaint, in accordance with one or more techniques of this disclosure.

FIG. 6 is a flow diagram showing an example process (600) by which a communication analysis system, such as communication analysis system 22 as shown in FIG. 2, may receive annotation data associated with a plurality of messages, and train a machine learning model to determine whether a message includes a complaint in accordance with one or more techniques of this disclosure. Communication analysis system receives a plurality of training messages (602). For example, the plurality of training messages may include a plurality of customer communications received by an organization.

The communication analysis system receives annotation data for each of the plurality of training messages indicative of whether the training message includes a complaint (604). For example, the annotation data may include annotation data indicative of whether the message includes a complaint, annotation data indicative of whether the message includes a high risk complaint, annotation data indicative of whether the message includes a negative behavior description, and/or annotation data indicative of a reason or category associated with the message. The annotation data may also include data indicative of whether the message is unusable. When the annotation data includes data indicative that the message includes a complaint, the annotation data may further include data indicative of the type of complaint. When the annotation data includes data indicative that the message includes a high risk complaint, the annotation data may further include data indicative of the type of high risk complaint. When the annotation data includes data indicative that the message includes a negative behavior description, the annotation data may further include data indicative of the type of negative behavior description.

The communication analysis system trains a machine learning model, based on the annotation data associated with each of the plurality of training messages, to classify or predict a characteristic associated with a novel message (606). For example, the communication analysis system may train a machine learning model, based on the annotation data associated with each of the plurality of training messages, to identify whether a novel message includes a complaint. As another example, the communication analysis system may train a machine learning model, based on the annotation data associated with each of the plurality of training messages, to identify whether a novel message includes a high risk complaint. As another example, the communication analysis system may train a machine learning model, based on the annotation data associated with each of the plurality of training messages, to identify whether a novel message includes a negative behavior description. As another example, the communication analysis system may train a machine learning model, based on the annotation data associated with each of the plurality of training messages, to identify whether a novel message includes a negative behavior description. As another example, the communication analysis system may train a machine learning model, based on the annotation data associated with each of the plurality of training messages, to identify a reason or category associated with a novel message.

As mentioned above, annotation analysis unit 240 as shown in FIG. 2A may monitor a performance of machine learning model of automated analysis system 26 after it is applied to classify novel messages to message center 12 (e.g., classify one or more of the novel messages as including a complaint, a high risk complaint, a negative behavior description and/or a reason/category). In some examples, annotation analysis unit 240 may determine an accuracy of the machine learning model by comparing classifications generated by machine learning model of automated analysis system 26 with annotation data received from human reviewers via annotation management system 28/200 for a plurality of messages. For example, if automated analysis system 26 determines that an incoming message does not include a high risk complaint, and annotation data received via annotation management system 28/200 indicates that the incoming message includes a high-risk complaint, annotation analysis unit 240 may record that the machine learning model of automated analysis system 26 made an incorrect high risk classification. Annotation analysis unit 240 may continuously monitor the accuracy of automated analysis system 26. Annotation analysis unit 240 may determine a fraction of messages in which automated analysis unit 26 correctly classifies an incoming message. The fraction may represent a measured accuracy of the model. Novel (i.e., new) messages may be analyzed by automated analysis unit 240, the novel messages representing data that was not used to train and create the model. In other words, annotation analysis unit 240 may test the accuracy of the model continuously using new data. In some examples, if annotation analysis unit 240 determines that the accuracy of machine learning model is below a threshold accuracy value (e.g., 90%), annotation analysis unit 240 may output a notification including the accuracy of the machine learning model and/or an indication that the machine learning model should be re-trained.

Automated analysis unit 26 may periodically (e.g., monthly, bi-monthly, yearly, or the like) re-train the machine learning model based on an updated set of training data. The updated set of training data may include any or all of the annotation training data previously used to train the machine learning model, and/or may include annotation data associated with a different set of messages received by message center 12 since the machine learning model was last trained.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
   memory; and
   one or more processors in communication with the memory and configured to:
      receive a plurality of messages received from one or more user devices;
      associate one or more of the plurality of messages with at least a first reviewer and a second reviewer;
      generate an annotation interface for display on a first computing device associated with the first reviewer and on a second computing device associated with the second reviewer, wherein the annotation interface displayed on the first computing device and the annotation interface displayed on the second computing device each includes a text data field including text data representative of a first message of the plurality of messages;

receive first annotation data for a complaint selector element indicating one of a yes or no value for the first message input into the annotation interface displayed on the first computing device associated with the first reviewer, the first annotation data indicative of whether the first message includes a complaint;

receive second annotation data for a complaint selector element indicating one of a yes or no value for the first message input into the annotation interface displayed on the second computing device associated with the second reviewer, the second annotation data indicative of whether the first message includes a complaint;

in response to a determination that the first annotation data and the second annotation data indicate the same yes or no value, select one of the first or second annotation data as ground truth annotation data for the first message based on a first reviewer permission level assigned to the first reviewer and a second reviewer permission level assigned to the second reviewer; and in response to a determination that the first annotation data and the second annotation data do not indicate the same yes or no value:

generate an annotation interface for display on a third computing device associated with a third reviewer, the third reviewer having a higher reviewer permission level than the first reviewer and the second reviewer, wherein the annotation interface displayed on the third computing device includes a text data field including the text data representative of the first message of the plurality of messages;

receive third annotation data for a complaint selector element indicating one of a yes or no value for the first message input into the annotation interface displayed on the third computing device associated with the third reviewer, the third annotation data indicative of whether the first message includes a complaint; and select the third annotation data as ground truth annotation data for the first message.

2. The computing system of claim 1, wherein the message comprises a voice message including voice data, and wherein the one or more processors are configured to:
receive text data representative of the message converted from the voice data by a voice-to-text engine.

3. The computing system of claim 1, wherein the one or more processors are configured to:
determine which of the first reviewer permission level or the second reviewer permission level is a higher reviewer permission level; and
select one of the first or second annotation data as ground truth annotation data for the first message based on which of the first reviewer permission level and the second reviewer permission level is the higher permission level.

4. The computing system of claim 1, wherein the one or more processors are configured to:
receive annotation data for each of the plurality of messages input into an annotation interface displayed on one or more computing devices associated with one or more reviewers, the annotation data for each of the plurality of messages indicative of whether the message includes a complaint.

5. The computing system of claim 1, wherein annotation data received for each of the plurality of messages includes annotation data indicative of whether the message includes two or more of a complaint, a high risk complaint, a negative behavior description, and a reason/category associated with the message.

6. The computing system of claim 1, wherein the one or more processors are further configured to:
train a machine learning model, based on annotation data received for each of the plurality of messages, to identify whether a novel message includes a complaint.

7. The computing system of claim 1, wherein the one or more processors are further configured to:
train a machine learning model, based on annotation data received for each of the plurality of messages, to identify whether a novel message includes one or more complaint types from a set of complaint types.

8. The computing system of claim 1, wherein a message of the plurality of messages includes a complaint, and wherein the one or more processors are further configured to:
train a machine learning model, based on annotation data received for each of the plurality of messages, to identify whether a novel message includes a high risk complaint.

9. The computing system of claim 1, wherein the annotation interface includes one or more interface elements for receipt of annotation data.

10. The computing system of claim 9, wherein the one or more interface elements includes a text entry interface element configured to receive one or more consecutive or non-consecutive words selected from the text data representative of the first message displayed in the text data field.

11. The computing system of claim 1, wherein the one or more processors are further configured to:
receive an indication that the first reviewer has completed input of the first annotation data associated with the first message into the annotation interface displayed on the first computing device; and
automatically display text data representative of a next message in a reviewer message queue associated with the first reviewer in the text data field of the annotation interface displayed on the first computing device associated with the first reviewer.

12. The computing system of claim 1, wherein the one or more processors are further configured to:
receive annotation data associated with each of a subset of the plurality of messages input into the annotation interface displayed on the first computing device associated with the first reviewer;
associate, in the annotation database, the first reviewer with the received annotation data associated with each of the assigned subset of the plurality of messages;
generate one or more statistics for the first reviewer based on an analysis of the annotation data associated with the assigned subset of the plurality of messages associated with the first reviewer.

13. The computing system of claim 1, wherein the plurality of messages includes any one or combination of voice messages, text messages, emails, and social media messages.

14. A method comprising:
receiving, by one or more processors, a plurality of messages received from one or more user devices;
associating, by the one or more processors, one or more of the plurality of messages with at least a first reviewer and a second reviewer;
generating, by the one or more processors, an annotation interface for display on a first computing device associated with the first reviewer and on a second computing device associated with the second reviewer, wherein the annotation interface displayed on the first computing device and the annotation interface displayed on the second computing device each includes a text data field including text data representative of a first message of the plurality of messages;
receiving, by the one or more processors, first annotation data for a complaint selector element indicating one of a yes or no value for the first message input into the annotation interface displayed on the first computing device associated with the first reviewer, the first annotation data indicative of whether the first message includes a complaint;
receiving, by the one or more processors, second annotation data for a complaint selector element indicating one of a yes or no value for the first message input into the annotation interface displayed on the second computing device associated with the second reviewer, the second annotation data indicative of whether the first message includes a complaint;
in response to a determination that the first annotation data and the second annotation data indicate the same yes or no value, selecting, by the one or more processors, one of the first or second annotation data as ground truth annotation data for the first message based on a first reviewer permission level assigned to the first reviewer and a second reviewer permission level assigned to the second reviewer; and
in response to a determination that the first annotation data and the second annotation data do not indicate the same yes or no value:
generating an annotation interface for display on a third computing device associated with a third reviewer, the third reviewer having a higher reviewer permission level than the first reviewer and the second reviewer, wherein the annotation interface displayed on the third computing device includes a text data field including the text data representative of the first message of the plurality of messages;
receive third annotation data for a complaint selector element indicating one of a yes or no value for the first message input into the annotation interface displayed on the third computing device associated with the third reviewer, the third annotation data indicative of whether the first message includes a complaint; and
select the third annotation data as ground truth annotation data for the first message.

15. The method of claim 14, further comprising:
determining, by the one or more processors, which of the first reviewer permission level or the second reviewer permission level is a higher reviewer permission level; and
selecting, by the one or more processors, one of the first or second annotation data as ground truth annotation data for the first message based on which of the first reviewer permission level and the second reviewer permission level is a higher permission level.

16. The method of claim 14, wherein annotation data received for each of the plurality of messages includes annotation data indicative of whether the message includes a high risk complaint.

17. The method of claim 14, further comprising:
training a machine learning model, based on annotation data received for each of the plurality of messages, to identify whether a novel message includes a complaint.

18. A non-transitory computer readable medium comprising instructions that when executed cause one or more processors to:
receive a plurality of messages received from one or more user devices;
associate one or more of the plurality of messages with at least a first reviewer and a second reviewer;
generate an annotation interface for display on a first computing device associated with the first reviewer and on a second computing device associated with the second reviewer, wherein the annotation interface displayed on the first computing device and the annotation interface displayed on the second computing device each includes a text data field including text data representative of a first message of the plurality of messages;
receive first annotation data for a complaint selector element indicating one of a yes or no value for the first message input into the annotation interface displayed on the first computing device associated with the first reviewer, the first annotation data indicative of whether the first message includes a complaint;
receive second annotation data for a complaint selector element indicating one of a yes or no value for the first message input into the annotation interface displayed on the second computing device associated with the second reviewer, the second annotation data indicative of whether the first message includes a complaint;
in response to a determination that the first annotation data and the second annotation data indicate the same yes or no value, select one of the first or second annotation data as ground truth annotation data for the first message based on a first reviewer permission level assigned to the first reviewer and a second reviewer permission level assigned to the second reviewer; and
in response to a determination that the first annotation data and the second annotation data do not indicate the same yes or no value:
generate an annotation interface for display on a third computing device associated with a third reviewer, the third reviewer having a higher reviewer permission level than the first reviewer and the second reviewer, wherein the annotation interface displayed on the third computing device includes a text data field including the text data representative of the first message of the plurality of messages;
receive third annotation data for a complaint selector element indicating one of a yes or no value for the first message input into the annotation interface displayed on the third computing device associated with the third reviewer, the third annotation data indicative of whether the first message includes a complaint; and
select the third annotation data as ground truth annotation data for the first message.

* * * * *